United States Patent
Hara

(10) Patent No.: US 11,831,245 B2
(45) Date of Patent: Nov. 28, 2023

(54) SWITCHING CONTROL DEVICE, DRIVING DEVICE, ISOLATED DC-DC CONVERTER, AC-DC CONVERTER, POWER ADAPTER, AND ELECTRIC APPLIANCE

(71) Applicant: Rohm Co., Ltd., Kyoto (JP)

(72) Inventor: Hideo Hara, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 429 days.

(21) Appl. No.: 17/206,022

(22) Filed: Mar. 18, 2021

(65) Prior Publication Data

US 2021/0211060 A1    Jul. 8, 2021

Related U.S. Application Data

(63) Continuation of application No. 16/592,218, filed on Oct. 3, 2019, now Pat. No. 10,985,667.

(30) Foreign Application Priority Data

Oct. 5, 2018 (JP) .................. 2018-190204
Oct. 5, 2018 (JP) .................. 2018-190207

(51) Int. Cl.
  *H02M 3/335*    (2006.01)
  *H02M 1/08*    (2006.01)

(52) U.S. Cl.
  CPC ......... *H02M 3/33592* (2013.01); *H02M 1/08* (2013.01)

(58) Field of Classification Search
  CPC ... H02M 3/33592; H02M 1/08; H02M 1/0009
  See application file for complete search history.

(56) References Cited

U.S. PATENT DOCUMENTS

| 10,241,143 B2* | 3/2019 | Park ............... H03K 17/0822 |
| 10,985,667 B2* | 4/2021 | Hara ............... H02M 3/33592 |
| 11,095,283 B2* | 8/2021 | Inoue ............... H03K 17/18 |
| 2007/0007912 A1 | 1/2007 | Yang et al. |
| 2007/0236286 A1 | 10/2007 | Kobayashi et al. |
| 2009/0289705 A1 | 11/2009 | Kobayashi et al. |
| 2013/0127401 A1 | 5/2013 | Fratti |
| 2018/0006569 A1 | 1/2018 | Kikuchi |
| 2018/0041132 A1 | 2/2018 | Fang et al. |
| 2018/0339356 A1 | 11/2018 | Mnich |

FOREIGN PATENT DOCUMENTS

| JP | 2007-235526 | 9/2007 |
| JP | 2009-240067 | 10/2009 |
| JP | 2013-070530 | 4/2013 |
| JP | 2013-150456 | 8/2013 |
| JP | 2018-019589 | 2/2018 |

* cited by examiner

*Primary Examiner* — Kyle J Moody
(74) *Attorney, Agent, or Firm* — Fish & Richardson P.C.

(57) ABSTRACT

A direct-current voltage is applied to a series circuit composed of a switching transistor, a sense resistor, and a coil. A control circuit is configured to be capable of performing current control in which the control circuit, after turning on the switching transistor, determines a turn-off time point of the switching transistor based on a sense voltage appearing across the sense resistor, and to turn off the switching transistor during the current control if, despite a predetermined time having passed after the switching transistor being turned on, the sense voltage does not reach a predetermined threshold voltage.

9 Claims, 13 Drawing Sheets

$V_{OFF}$: TURN-OFF THRESHOLD VOLTAGE

WITH SENSE RESISTOR ($R_{CS}$) SHORT-CIRCUITED $V_{OFF}$: TURN-OFF REFERENCE VOLTAGE
$V_{TH}$ : SHORT-CIRCUIT THRESHOLD VOLTAGE

POWER SHORT CIRCUIT

GROUND SHORT CIRCUIT

[EX5_1]

[EX5_2]

[EX5_3]

SWITCHING CONTROL DEVICE, DRIVING DEVICE, ISOLATED DC-DC CONVERTER, AC-DC CONVERTER, POWER ADAPTER, AND ELECTRIC APPLIANCE

CROSS-REFERENCE TO RELATED APPLICATIONS

This application is a continuation of U.S. application Ser. No. 16/592,218, filed Oct. 3, 2019, which claims priority under 35 U.S.C. § 119(a) on Patent Application No. 2018-190207 filed in Japan on Oct. 5, 2018 and on Patent Application No. 2018-190204 filed in Japan on Oct. 5, 2018, the entire contents of which are hereby incorporated by reference.

BACKGROUND OF THE INVENTION

1. Field of the Invention

The present invention relates to a switching control device, a driving device, an isolated DC-DC converter, an AC-DC converter, a power adapter, and electric appliance.

2. Description of Related Art

A switching control device is often used to drive the switching of a switching element connected in series with a coil (see Patent Document 1 identified below). In such cases, it is possible to adopt a configuration that uses a sense resistor to detect a current flowing through a switching element, and to use a current control method whereby, after the switching element is turned on, the time point for turning off the switching element is determined based on the voltage appearing across the sense resistor.

In a typical example, an application is known where a switching element is connected in series with the primary winding (coil) of a transformer, and the current control method is applied to the switching element.

In cases where the current control method mentioned above is used, if, for the sake of discussion, the sense resistor is short-circuited, the voltage appearing across the sense resistor ceases to indicate the current flowing through the switching element, and thus there is a risk of missing the opportunity to turn off the switching element, and as a result destroying or otherwise damaging the switching element. It is important to protect the switching element from destruction or other damage.

On the other hand, FIG. 21 shows a driving device 900 which includes a high-side transistor 901 and a low-side transistor 902. In FIG. 21, the connection node between the transistors 901 and 902, which are connected in series with each other, is connected to the output terminal 903 of the driving device 900 and, outside the driving device 900, the gate of a switching transistor 910 is connected to the output terminal 903. The driving device 900 can turn on or off the transistors 901 and 902 alternately and thereby drive the switching of the switching transistor 910.

In a driving device, an abnormal state may occur in which the output terminal is short-circuited to the supplied power or to the ground. For example, in the driving device 900 shown in FIG. 21, if the output terminal 903 is short-circuited to the supplied power with the low-side transistor 902 on, an excessive current flows through the low-side transistor 902; if the output terminal 903 is short-circuited to the ground with the high-side transistor 901 on, an excessive current flows through the high-side transistor 901. An excessive current may destroy or damage the driving device 900.

CITATION LIST

Patent Document 1: Japanese Patent Application published as No. 2009-240067
Patent Document 2: Japanese Patent Application published as No. 2013-070530

SUMMARY OF THE INVENTION

An object of the present invention is to provide a switching control device provided with a protection function related to a short circuit or the like of a sense resistor, and to provide an isolated DC-DC converter, an AC-DC converter, a power adapter, and an electric appliance employing such a switching control device.

Another object of the present invention is to provide a driving device provided with a protection function against occurrence of a fault such as a power short circuit, and to provide an isolated DC-DC converter, an AC-DC converter, a power adapter, and an electric appliance employing such a driving device.

According to one aspect of the present invention, a switching control device includes an output terminal connected to a control electrode of a switching element, a voltage input terminal receiving, as a sense voltage, the voltage appearing across a sense resistor to be connected in series with the switching element, a control circuit configured to generate a drive control signal, and a drive circuit configured to turn on or off the switching element via the output terminal based on the drive control signal. Here, the control circuit is configured to be capable of performing current control in which the control circuit, after turning on the switching element, determines the turn-off time point of the switching element based on the sense voltage, and to turn off the switching element during the current control if, despite a predetermined time having passed after the switching element being turned on, the sense voltage does not reach a predetermined threshold voltage. (A first configuration.)

In the switching control device according to the first configuration described above, preferably, a predetermined direct-current voltage is applied to the series circuit composed of the switching element, the sense resistor, and a coil, and during the on-period of the switching element, as time elapses after the turning-on of the switch element, a current that flows through the switching element increases. (A second configuration.)

In the switching control device according to the first or second configuration described above, preferably, the control circuit is configured, in the current control, to turn off the switching element in response to the sense voltage reaching a predetermined turn-off reference voltage after the switching element being turned on, and the threshold voltage is lower than the turn-off reference voltage. (A third configuration.)

In the switching control device according to the first or second configuration described above, preferably, the control circuit is configured, in the current control, to turn off the switching element in response to the sense voltage reaching a predetermined turn-off reference voltage after the switching element being turned on, and the threshold voltage has the same voltage value as the turn-off reference voltage. (A fourth configuration.)

In the switching control device according to any one of the first to fourth configurations described above, preferably, the switching control device is configured as a semiconductor integrated circuit. (A fifth configuration.)

According to another aspect of the present invention, an isolated DC-DC converter includes a transformer having a primary winding and a secondary winding, a switching transistor as a switching element connected to the primary winding, a sense resistor connected in series with the switching transistor, and a primary-side control circuit configured to control the turning on and off of the switching transistor. The isolated DC-DC converter generates an output voltage on the secondary side of the transformer from an input voltage applied to the primary winding. Here, the switching control device according to any one of the first to fifth configurations is used as the primary-side control circuit, and the control electrode of the switching transistor is connected to the output terminal of the switching control device, and the switching of the switching transistor is driven by the switching control device. (A sixth configuration.)

According to another aspect of the present invention, an AC-DC converter includes a rectification circuit configured to perform full-wave rectification on an alternating-current voltage, a smoothing capacitor smoothing the full-wave rectified voltage to generate a direct-current voltage, and the isolated DC-DC converter according to the sixth configuration described above generating a direct-current output voltage from an input voltage as the direct-current voltage. (A seventh configuration.)

According to another aspect of the present invention, a power adapter includes a plug receiving an alternating-current voltage, the AC-DC converter according to the seventh configuration described above, and a housing in which the AC-DC converter is housed. (An eighth configuration.)

According to an aspect of the present invention, an electric appliance includes the AC-DC converter according to the seventh configuration described above, and a load driven based on the output voltage of the AC-DC converter. (A ninth configuration.)

According to another aspect of the present invention, a driving device includes an output terminal, a drive circuit connected to the output terminal and configured to adjust the voltage level at the output terminal, and a state controller configured to control the state of the drive circuit. Here, the drive circuit is configured to be in one of a first state for making the voltage level at the output terminal equal to a predetermined first level, a second state for making the voltage level at the output terminal equal to a predetermined second level which is higher than the first level, and a third state. The impedance of the drive circuit as seen from the output terminal is higher in the third state than in the first state and in the second state, and the state controller is configured to turn the drive circuit to the third state if, despite a predetermined time having passed after the drive circuit being turned to the first state, the voltage at the output terminal does not fall to or below a predetermined threshold voltage which is higher than a voltage of the first level. (A tenth configuration.)

According to another aspect of the present invention, a driving device includes an output terminal, a drive circuit connected to the output terminal and configured to adjust the voltage level at the output terminal, and a state controller configured to control the state of the drive circuit. Here, the drive circuit is configured to be in one of a first state for making the voltage level at the output terminal equal to a predetermined first level, a second state for making the voltage level at the output terminal equal to a predetermined second level which is higher than the first level, and a third state. The impedance of the drive circuit as seen from the output terminal is higher in the third state than in the first state and in the second state, and the state controller is configured to turn the drive circuit to the third state if, despite a predetermined time having passed after the drive circuit being turned to the second state, the voltage at the output terminal does not rise to or above a predetermined threshold voltage which is lower than a voltage of the second level. (An eleventh configuration.)

In the driving device according to the tenth configuration described above, preferably, the drive circuit includes a first transistor and a second transistor which are connected in series with each other, Preferably, a predetermined driving voltage is applied to the series circuit composed of the first and second transistors, with the first transistor arranged on the higher potential side than the second transistor, and with the connection node between the first and second transistors connected to the output terminal. Preferably, in the first state, the first transistor is off and the second transistor is on; in the second state, the first transistor is on and the second transistor is off; and in the third state, the first and second transistors are both off (A twelfth configuration.)

In the driving device according to the eleventh configuration described above, preferably, the drive circuit includes a first transistor and a second transistor which are connected in series with each other. Preferably, a predetermined driving voltage is applied to the series circuit composed of the first and second transistors, with the first transistor arranged on the higher potential side than the second transistor, and with the connection node between the first and second transistors connected to the output terminal. Preferably, in the first state, the first transistor is off and the second transistor is on; in the second state, the first transistor is on and the second transistor is off; and in the third state, the first and second transistors are both off (A thirteenth configuration.)

According to still another aspect of the present invention, a driving device includes an output terminal, a drive circuit connected to the output terminal and configured to adjust the voltage level at the output terminal, and a state controller configured to control the state of the drive circuit. Here, the drive circuit is configured to be in one of a first state for making the voltage level at the output terminal equal to a predetermined first level and a second state for making the voltage level at the output terminal equal to a predetermined second level which is higher than the first level. The impedance of the drive circuit as seen from the output terminal is higher in the second state than in the first state, and the state controller is configured to turn the drive circuit to the second state if, despite a predetermined time having passed after the drive circuit being turned to the first state, the voltage at the output terminal does not fall to or below a predetermined threshold voltage which is higher than the voltage of the first level. (A fourteenth configuration.)

In the driving device according to the fourteenth configuration described just above, preferably, the drive circuit includes a pull-up resistor and a transistor which are connected in series with each other. Preferably, a predetermined driving voltage is applied to the series circuit composed of the pull-up resistor and the transistor, with the pull-up resistor arranged on the higher potential side than the transistor, and with the connection node between the pull-up resistor and the transistor connected to the output terminal. Preferably, the transistor is on in the first state and is off in the second state. (A fifteenth configuration.)

According to yet another aspect of the present invention, a driving device includes an output terminal, a drive circuit connected to the output terminal and configured to adjust the voltage level at the output terminal, and a state controller configured to control the state of the drive circuit. Here, the drive circuit is configured to be in one of a first state for making the voltage level at the output terminal equal to a predetermined first level, and a second state for making the voltage level at the output terminal equal to a predetermined second level which is higher than the first level. The impedance of the drive circuit as seen from the output terminal is higher in the first state than in the second state, and the state controller is configured to turn the drive circuit to the first state if, despite a predetermined time having passed after the drive circuit being turned to the second state, the voltage at the output terminal does not rise to or above a predetermined threshold voltage which is lower than the voltage of the second level. (A sixteenth configuration.)

In the driving device according to the sixteenth configuration described above, preferably, the drive circuit includes a transistor and a pull-down resistor which are connected in series with each other. Preferably, a predetermined driving voltage is applied to the series circuit composed of the transistor and the pull-down resistor, with the transistor arranged on the higher potential side than the pull-down resistor, and with the connection node between the transistor and the pull-down resistor connected to the output terminal. Preferably, the transistor is off in the first state and is on in the second state. (A seventeenth configuration.)

In the driving device according to any one of the tenth to seventeenth configurations described above, preferably, the driving device is configured as a semiconductor integrated circuit. (An eighteenth configuration.)

According to another aspect of the present invention, an isolated DC-DC converter includes a transformer having a primary winding and a secondary winding, a switching transistor connected to the primary winding, and a primary-side control circuit configured to control the turning on and off of the switching transistor. The isolated DC-DC converter generates an output voltage on the secondary side of the transformer from an input voltage applied to the primary winding. Here, the driving device according to any one of the tenth to eighteenth configurations described above is used as the primary-side control circuit. The gate of the switching transistor is connected to the output terminal of the driving device, and the switching of the switching transistor is driven by the driving device. (A nineteenth configuration.)

According to another aspect of the present invention, an AC-DC converter includes a rectification circuit configured to perform full-wave rectification on an alternating-current voltage, a smoothing capacitor smoothing the full-wave rectified voltage to generate a direct-current voltage, and the isolated DC-DC converter according to the nineteenth configuration described above generating a direct-current output voltage from an input voltage as the direct-current voltage. (A twentieth configuration.)

According to another aspect of the present invention, a power adapter includes a plug receiving an alternating-current voltage, the AC-DC converter according to the twentieth configuration described above, and a housing in which the AC-DC converter is housed. (A twenty-first configuration.)

According to an aspect of the present invention, an electric appliance includes the AC-DC converter according to the twentieth configuration described above, and a load driven based on an output voltage of the AC-DC converter. (A twenty-second configuration.)

According to the present invention, it is possible to provide a switching control device provided with a protection function related to a short circuit or the like of a sense resistor, and an isolated DC-DC converter, an AC-DC converter, a power adapter, and an electric appliance which use such a switching control device. According to the present invention, it is also possible to provide a driving device provided with a protection function against occurrence of a fault such as a power short circuit, and an isolated DC-DC converter, an AC-DC converter, a power adapter, and an electric appliance which use such a driving device.

DETAILED DESCRIPTION OF PREFERRED EMBODIMENTS

Hereinafter, examples embodying the present invention will be described specifically with reference to the accompanying drawings. Among the diagrams referred to, the same parts are identified by the same reference signs, and in principle no overlapping description of the same parts will be repeated. In the present description, for the sake of simple description, symbols and other designations referring to information, signals, physical quantities, components, and the like are occasionally used with the names of the corresponding information, signals, physical quantities, components, and the like omitted or abbreviated. For example, although a switching transistor described later and identified by the reference symbol "M1" (see FIG. 1) is mentioned as "switching transistor M1" at some places and is abbreviated to "transistor M1" at other places, these and similar designations all refer to the same component.

First, some terms used to describe embodiments will be defined. A level denotes the level of a potential, and with respect to a given signal or voltage, high level has a higher potential than low level. With respect to any signal or voltage that switches periodically between high and low levels, the proportion of the length of the period in which the level of the signal or voltage is high level to the length of the period corresponding to one cycle of the signal or voltage is referred to as the duty ratio.

With respect to a given transistor (switching element) configured as an FET (field-effect transistor), an on state denotes that the drain-source channel of the transistor is in a conducting state, and an off state denotes that the drain-source channel of the transistor is in a non-conducting (cut-off) state. In the following description, with respect to a given transistor, its being in an on or off state is often described simply as being on or off respectively. With respect to a given transistor, its switching from an off state to an on state is described as turning on, and its switching from an on state to an off state is referred to as turning off.

First Embodiment

Figure 1:
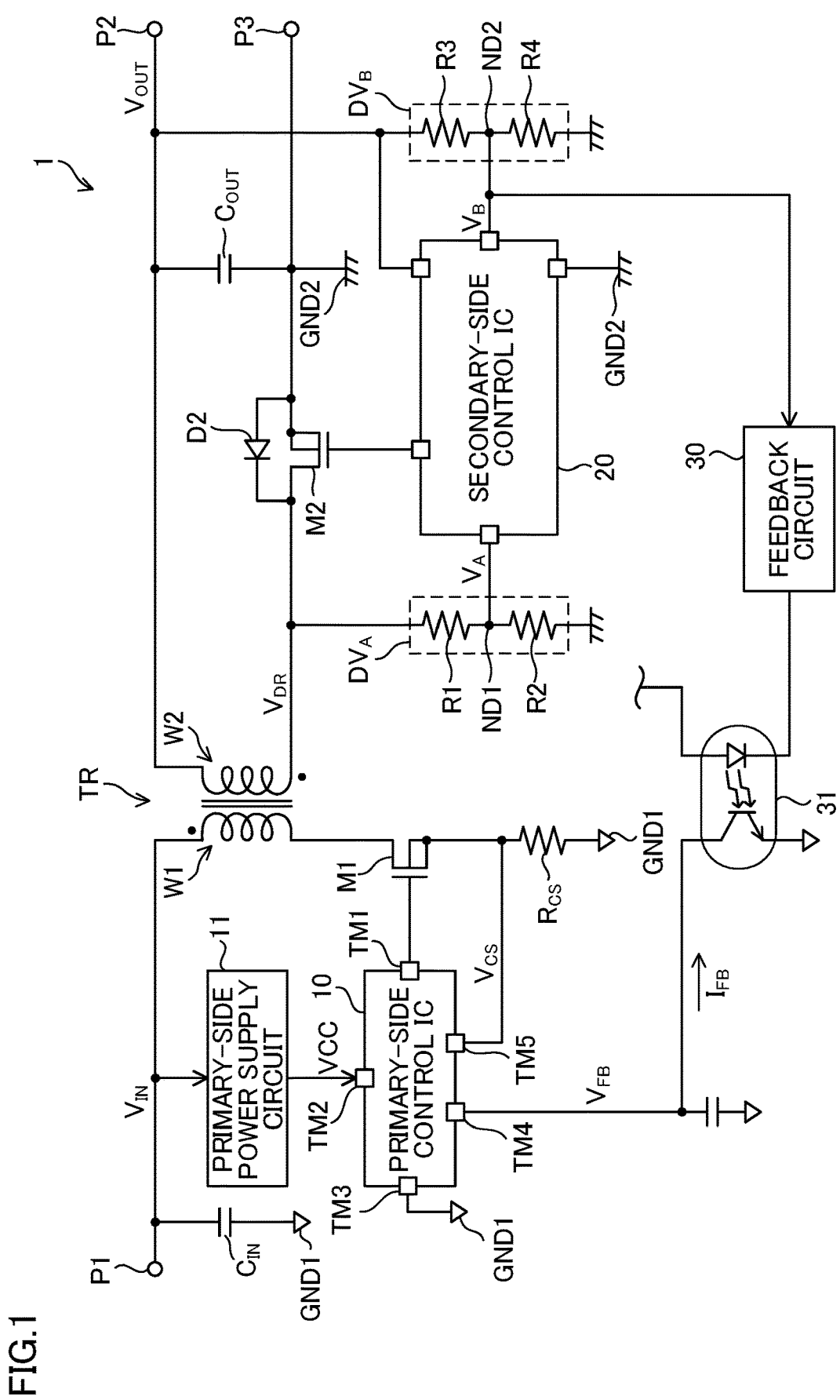
FIG. 1 is an overall configuration diagram of a DC-DC converter according to a first embodiment of the present invention.

A first embodiment of the present invention will be described. FIG. 1 is an overall configuration diagram of an isolated synchronous-rectification DC-DC converter 1 (hereinafter also referred to simply as the DC-DC converter 1) according to the first embodiment of the present invention. The DC-DC converter 1 is a flyback DC-DC converter, and generates, from a direct-current input voltage $V_{IN}$ applied to an input terminal P1, a direct-current output voltage $V_{OUT}$ stabilized at a desired target voltage $V_{TG}$.

The DC-DC converter 1 is composed of a primary-side circuit and a secondary-side circuit which are electrically isolated from each other. The ground in the primary-side circuit is represented by "GND1" and the ground in the secondary-side circuit is represented by "GND2". In each of the primary-side and secondary-side circuits, the ground refers to a conductive part at a reference potential of 0 V (zero volts) (that is, a predetermined-potential point), or refers to the reference potential itself. Being isolated from each other, the ground GND1 and the ground GND2 can have different potentials.

The DC-DC converter 1 includes a pair of output terminals P2 and P3, of which the output terminal P3 is connected to the ground GND2, and, as seen from the potential at the output terminal P3 (that is, the potential of the ground GND2), the output voltage $V_{OUT}$ is applied to the output terminal P2. The DC-DC converter 1 can supply the output voltage $V_{OUT}$ to any load (not shown) connected between the output terminals P2 and P3.

The DC-DC converter 1 includes a transformer TR having a primary winding W1 and a secondary winding W2. In the transformer TR, the primary and secondary windings W1 and W2 are electrically isolated from each other, but are magnetically coupled with each other with opposite polarities.

The primary-side circuit of the DC-DC converter 1 includes, in addition to the primary winding W1, a primary-side control IC 10 as a primary-side control circuit, a primary-side power supply circuit 11, an input capacitor $C_{IN}$, a switching transistor M1, and a sense resistor $R_{CS}$. The switching transistor M1 is configured as an N-channel MOSFET (metal-oxide-semiconductor field-effect transistor). The primary-side control IC 10 is configured as a semiconductor integrated circuit. One end of the primary winding W1 is connected to the input terminal P1 to receive the direct-current input voltage $V_{IN}$. The other end of the primary winding W1 is connected to the drain of the switching transistor M1, and the source of the switching transistor M1 is connected to the ground GND1 via the sense resistor $R_{CS}$. The input capacitor $C_{IN}$ is provided between the input terminal P1 and the ground GND1, and the input voltage $V_{IN}$ is applied across the input capacitor $C_{IN}$. The primary-side power supply circuit 11 performs DC-DC conversion on the input voltage $V_{IN}$ to thereby generate a supply voltage VCC having a desired voltage value, and supplies the supply voltage VCC to the primary-side control IC 10. The primary-side control IC 10 operates based on the supply voltage VCC.

The secondary-side circuit of the DC-DC converter 1 includes, in addition to the secondary winding W2, a secondary-side control IC 20 as a secondary-side control circuit, a feedback circuit 30, a synchronous rectification transistor M2, a diode D2, voltage dividing resistors R1 to R4, and an output capacitor $C_{OUT}$. The secondary-side control IC 20 is configured as a semiconductor integrated circuit. The voltage dividing resistors R1 and R2 constitute a voltage dividing circuit $DV_A$, and the voltage dividing resistors R3 and R4 constitute a voltage dividing circuit $DV_B$. The synchronous rectification transistor M2 (hereinafter also referred to as the SR transistor M2) is configured as an N-channel MOSFET. The diode D2 is a parasite diode of the SR transistor M2. Thus, the diode D2 is connected in parallel with the SR transistor M2 with the forward direction of the diode D2 pointing from the source to the drain of the SR transistor M2. The diode D2 may be a diode provided separately from the parasite diode.

One end of the secondary winding W2 is connected to the output terminal P2, and thus to the one end of the secondary winding W2, the output voltage $V_{OUT}$ is applied. The other end of the secondary winding W2 is connected to the drain of the SR transistor M2. The voltage at the other end of the secondary winding W2 (in other words, the drain voltage of the SR transistor M2) is represented by "$V_{DR}$". The connection node between the other end of the secondary winding W2 and the drain of the SR transistor M2 is connected to one end of the voltage dividing resistor R1, and the other end of the voltage dividing resistor R1 is connected to the ground GND2 via the voltage dividing resistor R2. Thus, to the connection node ND1 between the voltage dividing resistors R1 and R2, a division voltage $V_A$ is applied that results from the division of the voltage $V_{DR}$ by the voltage dividing circuit $DV_A$. On the other hand, the output terminal P2, to which the output voltage $V_{OUT}$ is applied, is connected to one end of the voltage dividing resistor R3, and the other end of the voltage dividing resistor R3 is connected to the ground GND2 via the voltage dividing resistor R4. Thus, to the connection node ND2 between the voltage dividing resistors R3 and R4, a division voltage $V_B$ is applied that results from the division of the output voltage $V_{OUT}$ by the voltage dividing circuit $DV_B$.

The source of the SR transistor M2 is connected to the ground GND2. The output capacitor $C_{OUT}$ is provided between the output terminals P2 and P3, and the output voltage $V_{OUT}$ is applied across the output capacitor $C_{OUT}$. A resistor for detecting an overcurrent may be provided between the output capacitor $C_{OUT}$ and the load (not shown) of the DC-DC converter 1.

The secondary-side control IC 20 uses the output voltage $V_{OUT}$ as the drive voltage, and controls the gate voltage of the SR transistor M2 based on the voltage $V_A$ or based on the voltages $V_A$ and $V_B$ to thereby control the turning on and off of the SR transistor M2. Here, the gate voltage of the SR transistor M2 is controlled such that the transistors M1 and M2 are not on simultaneously. The SR transistor M2 can be controlled by any of control methods including well-known ones. For example, starting with a state where the SR transistor M2 is off, the secondary-side control IC 20 turns on the SR transistor M2 in response to the falling of the voltage $V_A$ to or below a predetermined negative turn-on threshold voltage (for example, −100 mV), and then turns off the SR transistor M2 in response to the rising of the voltage $V_A$ to or above a predetermined negative turn-off threshold voltage (for example, −10 mV). The turn-off threshold voltage is higher than the turn-on threshold voltage.

In the DC-DC converter 1, a photocoupler 31 is provided to bridge between the primary-side and secondary-side circuits. The photocoupler 31 has a light emitting element arranged in the secondary-side circuit and a light sensing element arranged in the primary-side circuit. The light emitting element of the photocoupler 31 is biased with the output voltage $V_{OUT}$ or with a division voltage of the output voltage $V_{OUT}$, and the feedback circuit 30 drives the light emitting element of the photocoupler 31 such that the output voltage $V_{OUT}$ follows the desired target voltage $V_{TG}$. For example, as shown in FIG. 1, the feedback circuit 30 is connected to the node ND2 and, based on the division voltage $V_B$ of the output voltage $V_{OUT}$, supplies a current commensurate with the error between the output voltage $V_{OUT}$ and the target voltage $V_{TG}$ to the light emitting element of the photocoupler 31. The feedback circuit 30 is configured as a shunt regulator, an error amplifier, or the like.

The primary-side control IC 10 is connected to the light sensing element of the photocoupler 31, so that a feedback signal $V_{FB}$ commensurate with a feedback current $I_{FB}$ which flows through the light sensing element of the photocoupler 31 is fed to the primary-side control IC 10. Also, a current detection signal $V_{CS}$ corresponding to the voltage drop across the sense resistor $R_{CS}$ is fed to the primary-side IC 10.

The primary-side control IC 10 is connected to the gate of the switching transistor M1, and feeds a pulse signal to the gate of the switching transistor M1 to thereby drive the switching of the switching transistor M1. The pulse signal is a signal with a rectangular waveform of which the signal level switches between low level and high level. When the gate of the transistor M1 is fed with a low-level signal or a high-level signal, the transistor M1 is in the off state or in the on state, respectively. There are no particular restrictions on the configuration of, or on the control method for, the primary-side control IC 10. For example, the primary-side control IC 10 may use PWM modulation (pulse width modulation) to feed a pulse signal with a duty ratio commensurate with the feedback signal $V_{FB}$ to the gate of the switching transistor M1, or may use PFM modulation (pulse frequency modulation) to feed a pulse signal with a frequency commensurate with the feedback signal $V_{FB}$ to the gate of the switching transistor M1. For another example, the primary-side control IC 10 may be a current-mode modulator. In that case, for example, the duty ratio of the pulse signal fed to the gate of the switching transistor M1 is adjusted in accordance with the current detection signal $V_{CS}$.

Figure 2:
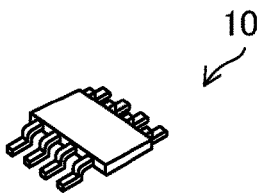
FIG. 2 is an exterior perspective view of the primary-side control IC shown in FIG. 1.

FIG. 2 shows an example of the exterior appearance of the primary-side control IC 10. The primary-side control IC 10 is an electronic component (semiconductor device) produced by enclosing a semiconductor integrated circuit in a resin housing (package), and various circuits constituting the primary-side control IC 10 are integrated together using semiconductor elements. The housing of the electronic component as the primary-side control IC 10 is provided with a plurality of external terminals exposed outside the IC 10. The number of external terminals shown in FIG. 2 is merely illustrative. The secondary-side control IC 20 has a structure similar to that of the primary-side control IC 10 shown in FIG. 2.

As part of the plurality of external terminals provided in the primary-side control IC 10, external terminals TM1 to TM5 are shown in FIG. 1. The external terminal TM1 is an output terminal and is connected to the gate of the switching transistor M1. The external terminal TM2 is a power terminal and receives the supply voltage VCC from the primary-side power supply circuit 11. The external terminal TM3 is a ground terminal and is connected to the ground GND1. The external terminals TM4 and TM5 receive the feedback signal $V_{FB}$ and the current detection signal $V_{CS}$, respectively.

Now, with focus on the primary-side circuit, a more detailed description will be given of the configuration and the operation of part of the primary-side circuit. Note that, in connection with this embodiment, the following description assumes that a voltage mentioned with no specific reference given is a voltage relative to the potential of the ground GND1, and that, unless otherwise noted, 0 V (zero volts) refers to the potential of the ground GND1.

Figure 3:
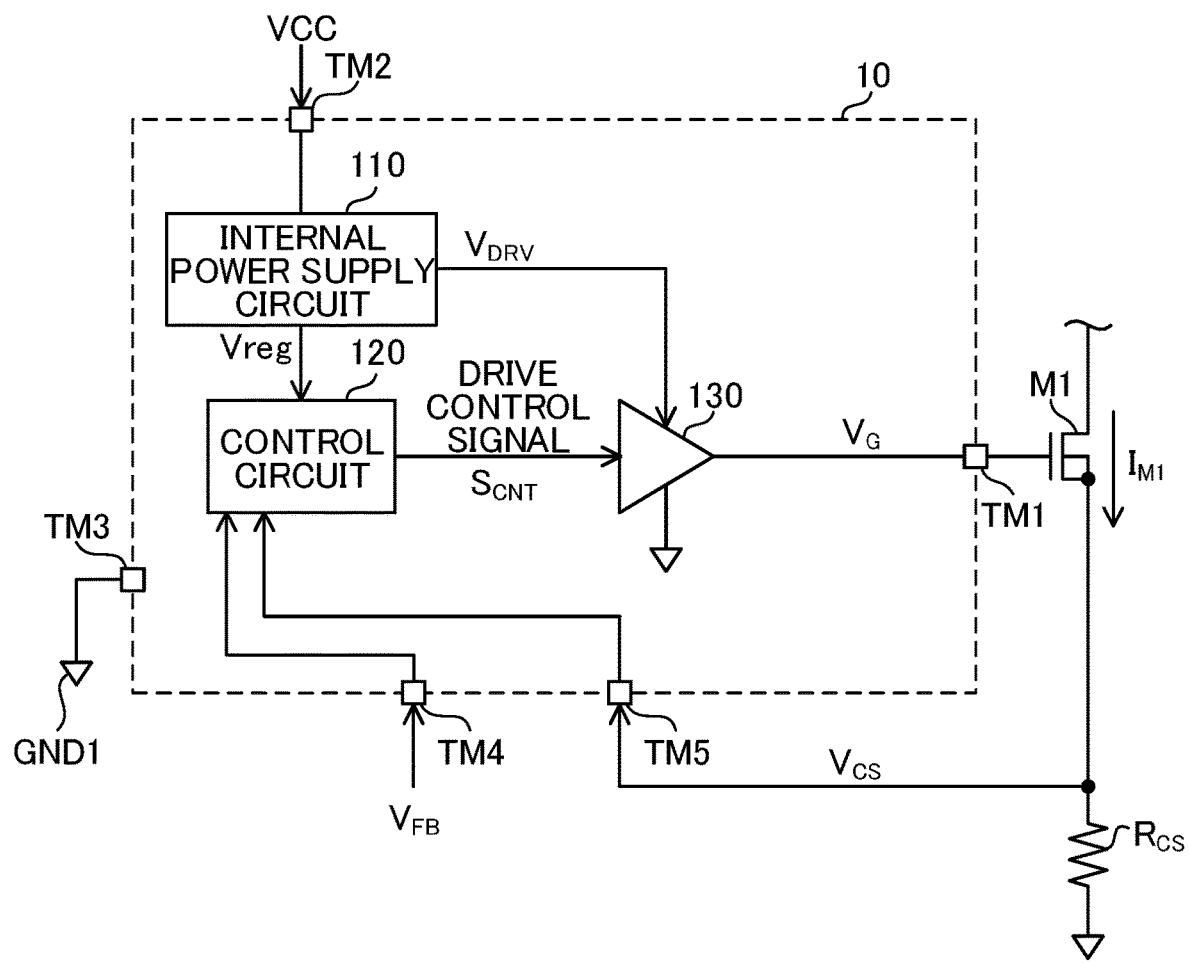
FIG. 3 is an outline block diagram of the primary-side control IC shown in FIG. 1.

FIG. 3 shows an outline of an internal configuration of the primary-side control IC 10. The primary-side control IC 10 includes an internal power supply circuit 110, a control circuit 120, and a drive circuit 130.

The internal power supply circuit 110 performs DC-DC conversion on the supply voltage VCC fed to the power terminal TM2 to thereby generate one or more other direct-current voltages. Here, it is assumed that the direct-current voltages generated by the internal power supply circuit 110 include an internal supply voltage Vreg and a driving voltage $V_{DRV}$. The internal supply voltage Vreg and the driving voltage $V_{DRV}$ are each a positive direct-current voltage with a predetermined voltage value. For example, the supply voltage VCC is a voltage of 14 V or more, and the voltages Vreg and $V_{DRV}$ are 4 V and 12 V, respectively.

The control circuit 120 operates based on the internal supply voltage Vreg. The control circuit 120 is configured as a logic circuit, or as an analog circuit plus a logic circuit. Based on at least one of the feedback signal $V_{FB}$ and the current detection signal $V_{CS}$, the control circuit 120 generates a drive control signal $S_{CNT}$ for making the switching transistor M1 perform switching, and feeds the drive control signal $S_{CNT}$ to the drive circuit 130. The drive control signal $S_{CNT}$ may be, for example, a signal modulated by PWM or PFM.

The drive circuit 130 operates based on the driving voltage $V_{DRV}$. The drive circuit 130 is connected to the output terminal TM1 and controls the gate voltage of the switching transistor M1 according to the drive control signal $S_{CNT}$. In other words, the drive circuit 130 adjusts the voltage level at the output terminal TM1 under the control of the control circuit 120. The output terminal TM1 is, outside the IC10, connected to the gate of the switching transistor M1. The voltage at the output terminal TM1 is represented by "$V_G$", and will hereinafter occasionally be referred to as the output terminal voltage $V_G$. In the DC-DC converter 1, the output terminal voltage $V_G$ is equal to the gate voltage of the switching transistor M1. The current that flows through the channel of the switching transistor M1 (that is, the current that flows between the drain and the source of the switching transistor M1) will be represented by "$I_{M1}$". In the DC-DC converter 1 shown in FIG. 1, the current $I_{M1}$ is equal to the current that flows through the primary winding W1.

Figure 4:
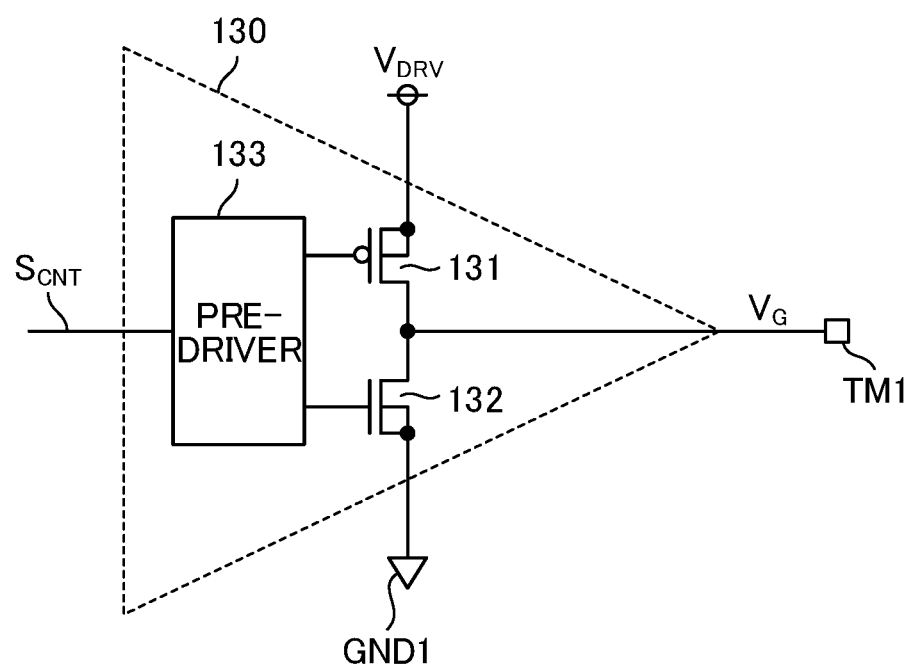
FIG. 4 is an internal configuration diagram of the drive circuit shown in FIG. 3.

FIG. 4 shows an example of the internal configuration of the drive circuit 130. The drive circuit 130 in FIG. 4 includes transistors 131 and 132, which are connected in series with each other, and a pre-driver 133. The transistor 131 is configured as a P-channel MOSFET, and the transistor 132 is configured as an N-channel MOSFET. A modification is possible where the transistor 131 is configured as an N-channel MOSFET. To the series circuit composed of the transistors 131 and 132, the driving voltage $V_{DRV}$ is applied. More specifically, the driving voltage $V_{DRV}$ is applied to the source of the transistor 131, the drains of the transistors 131 and 132 are connected together, and the source of the transistor 132 is connected to the ground GND1. The connection node between the drains of the transistors 131 and 132 is connected to the output terminal TM1. The pre-driver 133 controls the turning on and off of the transistors 131 and 132 according to the drive control signal $S_{CNT}$ from the control circuit 120. The drive control signal $S_{CNT}$ is a binary signal which is either at high level or at low level.

When the drive control signal $S_{CNT}$ is at high level, the pre-driver 133 feeds a low-level signal to the gates of the transistors 131 and 132 to thereby turn the transistors 131 and 132 to the on and off states, respectively. When the transistors 131 and 132 are in the on and off states, respectively, the output terminal voltage $V_G$ turns, through a transient state, to high level (the level of the driving voltage $V_{DRV}$), so that the switching transistor M1 turns to the on state.

When the drive control signal $S_{CNT}$ is at low level, the pre-driver 133 feeds a high-level signal to the gates of the transistors 131 and 132 to thereby turn the transistors 131 and 132 to the off and on states, respectively. When the transistors 131 and 132 are in the off and on states, respectively, the output terminal voltage $V_G$ turns, through a transient state, to low level (the level of the ground GND1), so that the switching transistor M1 turns to the off state.

Here, to prevent the transistors 131 and 132 from being in the on state simultaneously, the pre-driver 133 may as necessary insert a dead time in which the transistors 131 and 132 are both in the off state.

The control circuit 120 can, by feeding the drive control signal $S_{CNT}$, of which the signal level switches between high level and low level, to the drive circuit 130, make the transistor M1 perform switching (that is, switch the switching transistor M1 between the on and off states).

The above-discussed operation using the feedback circuit 30 is performed during feedback control. Feedback control is control that can be performed only when the output voltage $V_{OUT}$ in the secondary-side circuit has stabilized at the target voltage $V_{TG}$, or has risen to a voltage close to the target voltage $V_{TG}$, and the feedback circuit 30 is operating effectively. In feedback control, the drive control signal $S_{CNT}$ is generated based on the feedback signal $V_{FB}$ commensurate with the output voltage $V_{OUT}$.

Figure 5:
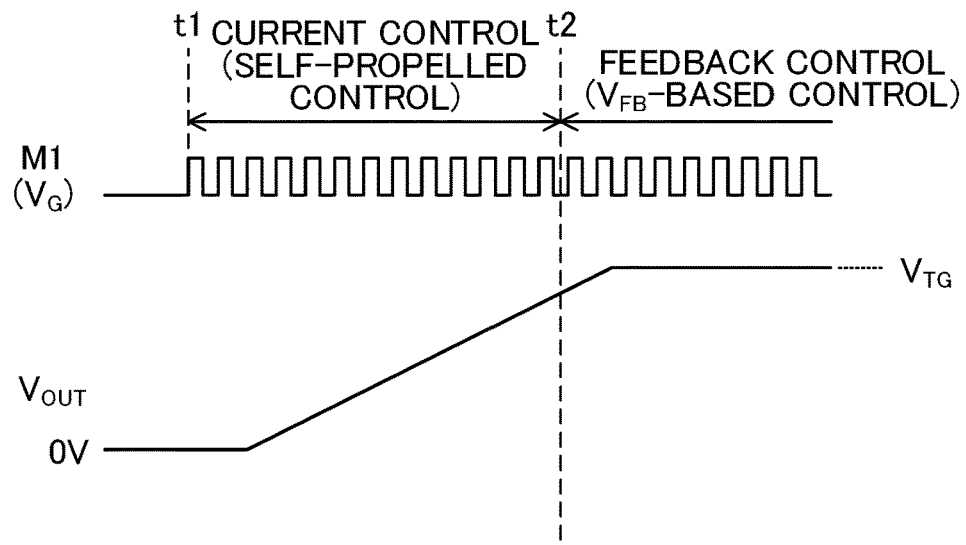
FIG. 5 is a diagram showing the state of a switching transistor and the behavior of the output voltage as observed around the time of starting-up of the primary-side control IC.

As shown in FIG. 5, starting when the output voltage $V_{OUT}$ of the secondary-side circuit is at the same potential as the ground GND2 (the 0 V potential in the secondary-side circuit), suppose that, on receiving the supply voltage VCC, the primary-side control IC 10 starts up at time point t1. Immediately after time point t1, the output voltage $V_{OUT}$ is zero or sufficiently low, and thus the feedback circuit 30 has not started up and thus no effective feedback signal $V_{FB}$ is fed to the primary-side control IC 10. Thus, immediately after start-up, the primary-side control IC 10 performs current control that does not rely on the feedback signal $V_{FB}$, that is, current control also referred to as self-propelled control. Here, it is assumed that current control that does not rely on the feedback signal $V_{FB}$ is performed during the period from time point t1 to time point t2 thereafter. At time point t2, an effective feedback signal $V_{FB}$ starts to be fed from the feedback circuit 30 to the primary-side control IC 10, and feedback control is performed after time point T2.

Figure 6:
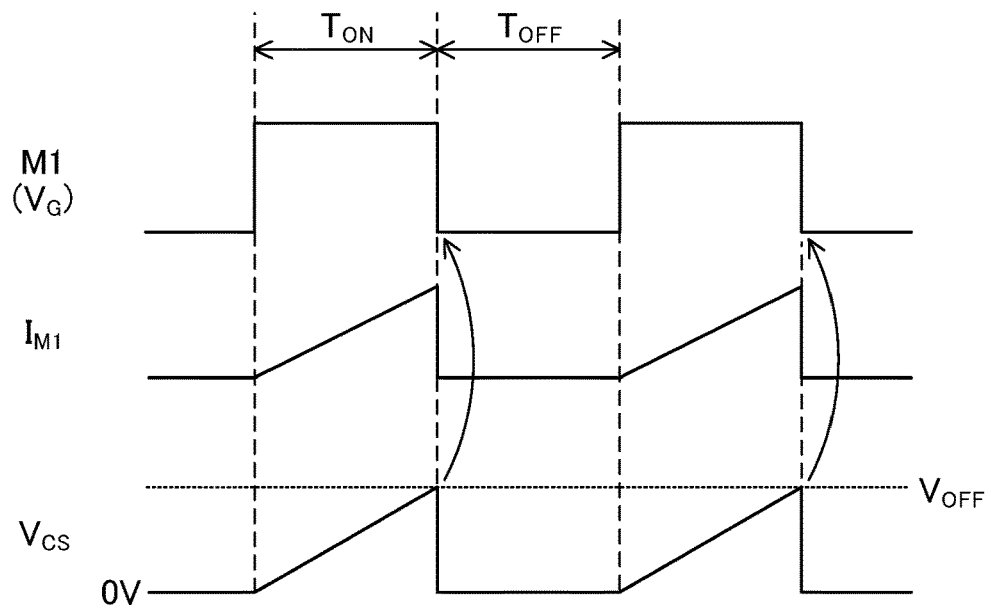
FIG. 6 is a diagram illustrating current control according to the first embodiment of the present invention.

With reference to FIG. 6, current control (self-propelled control) will be described. Note that, in the following description, for convenience of description, the voltage indicated by the current detection signal $V_{CS}$ will be referred to as a sense voltage, and the sense voltage will also be represented by "$V_{CS}$". The sense voltage $V_{CS}$ is a voltage applied to the external terminal TM5, and is equal to the voltage appearing across the sense resistor $R_{CS}$ (that is, the voltage drop across the sense resistor $R_{CS}$). A period during which the switching transistor M1 is on will be referred to as an on-period, and a period during which the switching transistor M1 is off will be referred to as an off-period. A period during which the output terminal voltage $V_G$ is at high level or low level corresponds to an on-period or an off-period, respectively. The length of one on-period and the length of one off-period during the switching of the switching transistor M1 will be referred to as an on-time $T_{ON}$ and an off-time $T_{OFF}$, respectively.

Current control is control in which, after the switching transistor M1 is turned on, the turn-off time point of the switching transistor M1 is determined based on the sense voltage $V_{CS}$, which is commensurate with the current $I_{M1}$. Specifically, in current control, the control circuit 120 controls the drive circuit 130 such that the switching transistor M1 turns on (that is, the output terminal voltage $V_G$ switches from low level to high level) and then monitors the sense voltage $V_{CS}$ to check whether or not the sense voltage $V_{CS}$ has reached a predetermined turn-off reference voltage $V_{OFF}$ so that, on finding that the sense voltage $V_{CS}$ has reached the turn-off reference voltage $V_{OFF}$, the control circuit 120 controls the drive circuit 130 such that the switching transistor M1 turns off (that is, the output terminal voltage $V_G$ turns from high level to low level). After this, the control circuit 120 waits for a predetermined time to elapse, and then controls the drive circuit 130 such that the switching transistor M1 turns on again. Thereafter, similar operation is repeated. As has been discussed above, the control circuit 120 can, by turning the drive control signal $S_{CNT}$ to high level and low level, turn on and off the switching transistor M1 via the drive circuit 130. The turn-off reference voltage $V_{OFF}$ has a predetermined positive direct-current voltage value.

In current control, the off-time $T_{OFF}$ may be a fixed length of time. In that case, the switching cycle of the switching transistor M1 can vary according to the on-time $T_{ON}$. The switching cycle of the switching transistor M1 is given as the sum of one on-time $T_{ON}$ and one off-time $T_{OFF}$ occurring one after the other.

Or, in current control, the switching cycle of the switching transistor M1 may be constant. In current control, when the switching cycle of the switching transistor M1 is constant, the off-time $T_{OFF}$ is determined for each cycle in accordance with the on-time $T_{ON}$ of the switching transistor M1. Note that, since the switching cycle of the switching transistor M1 corresponds to the cycle of the drive control signal $S_{CNT}$ and to the cycle of the output terminal voltage $V_G$, a constant switching cycle of the switching transistor M1 means that the cycles of the drive control signal $S_{CNT}$ and the output terminal voltage $V_G$ are constant. The cycle of the drive control signal $S_{CNT}$ refers to the length of time from one time that the level of the drive control signal $S_{CNT}$ is turned from low level to high level until the next time that the level of the drive control signal $S_{CNT}$ is turned from the low level to high level. Likewise, the cycle of the output terminal voltage $V_G$ refers to the length of time from one time that the level of the output terminal voltage $V_G$ is turned from low level to high level until the next time that the level of the output terminal voltage $V_G$ is turned from the low level to high level.

To the series circuit composed of the primary winding W1, the switching transistor M1, and the sense resistor $R_{CS}$, the input voltage $V_{IN}$ is applied which is a predetermined direct-current voltage, and thus, in the on-period of the switching transistor M1, the longer the time that elapses from when the switching transistor M1 turns on, the larger the current $I_{M1}$ that flows through the switching transistor M1. In current control, operation in which the switching transistor M1 is turned on and is then turned off in response to the current $I_{M1}$ reaching a current value corresponding to the turn-off reference voltage $V_{OFF}$ is repeated.

Figure 7:
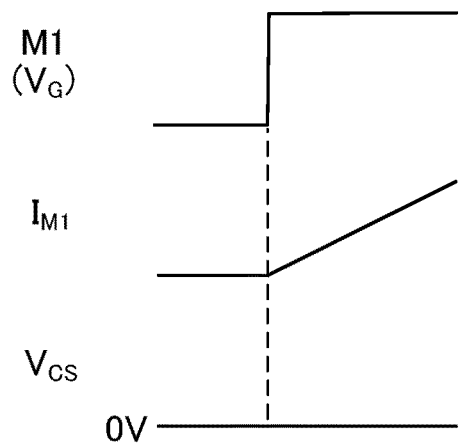
FIG. 7 is a diagram showing the waveforms of a voltage and a current etc. as observed when a sense resistor is short-circuited in the first embodiment of the present invention.

As discussed above, normally, the sense voltage $V_{CS}$ proportional to the current $I_{M1}$ is fed to the external terminal TM5, but, as shown in FIG. 7, if a fault that short-circuits the sense resistor $R_{CS}$ occurs, the sense voltage $V_{CS}$ fed to the external terminal TM5 becomes 0 V regardless of the current $I_{M1}$. If current control as discussed above is performed with the sense voltage $V_{CS}$ kept at 0 V regardless of the current $I_{M1}$, there is a risk of an excessive current $I_{M1}$ flowing to destroy or damage a component (in particular, for example, the switching transistor M1) on the path of the current $I_{M1}$, and a rise in temperature may exert adverse effects even around that component. A similar trouble arises also in a case where the resistance value of the sense resistor $R_{CS}$ is abnormally low.

Figure 8:
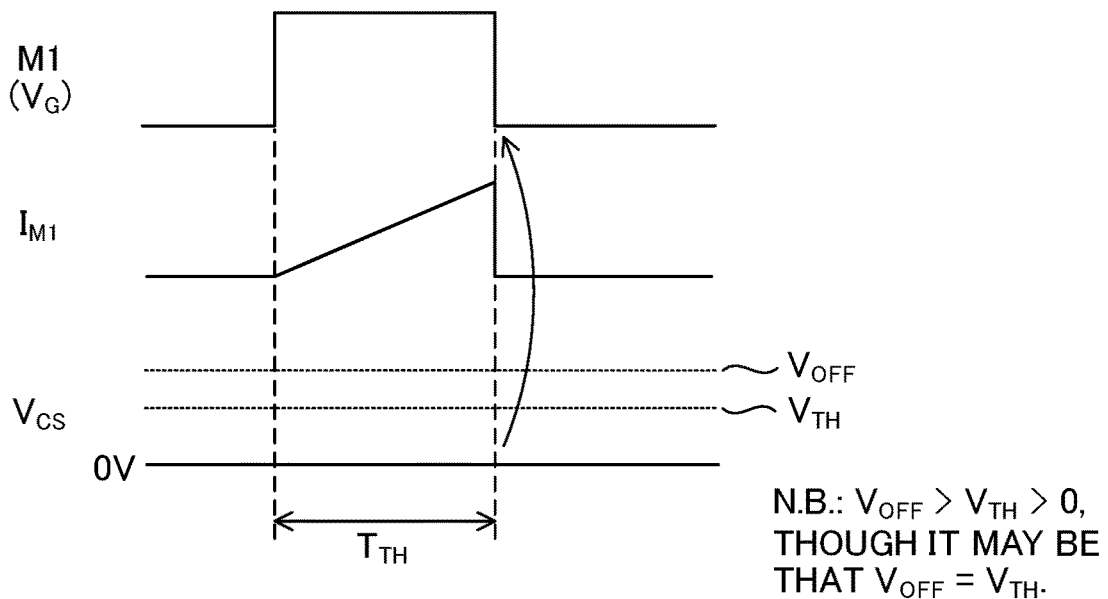
FIG. 8 is a diagram illustrating protection operation performed when a sense resistor is short-circuited in the first embodiment of the present invention.

The control circuit 120 is provided with a protection function related to a short circuit in the sense resistor $R_{CS}$ and other faults. Specifically, in current control, the control circuit 120 operates in the following manner. As shown in FIG. 8, in current control, after turning on the switching transistor M1 via the drive circuit 130, the control circuit 120 counts, by using a timer (not shown) in it, the elapsed time $T_{TIMER}$ that has elapsed after the time point that it turned on the switching transistor M1, and if, despite the elapsed time $T_{TIMER}$ having reached a predetermined upper limit time $T_{TH}$, the sense voltage $V_{CS}$ does not reach a predetermined short-circuit threshold voltage $V_{TH}$, the control circuit 120 judges that a short circuit has occurred, and turns off the switching transistor M1 via the drive circuit 130.

On judging that a short circuit has occurred, from then on until a predetermined reset signal is fed to the primary-side control IC 10, the control circuit 120 keeps the drive control signal $S_{CNT}$ at low level to thereby keep the switching transistor M1 off. Or, after judging that a short circuit has occurred, the control circuit 120 may wait for a predetermined cooling-down time to elapse and then restart current control as discussed above. The judgment that a short circuit has occurred may be discarded by cutting off the supply of the supply voltage VCC to the primary-side control IC 10.

Through such operation, even if a short circuit has occurred in the sense resistor $R_{CS}$, it is possible to avoid destruction of the switching transistor M1 or other damage to it.

The short-circuit threshold voltage $V_{TH}$ has a predetermined positive direct-current voltage value. The short-circuit threshold voltage $V_{TH}$ may be set at a voltage lower than the turn-off reference voltage $V_{OFF}$. Or, the short-circuit threshold voltage $V_{TH}$ may be equal to the turn-off reference voltage $V_{OFF}$ (that is, the short-circuit threshold voltage $V_{TH}$ and the turn-off reference voltage $V_{OFF}$ may have the same voltage value).

In a case where the short-circuit threshold voltage $V_{TH}$ is made equal to the turn-off reference voltage $V_{OFF}$, simply by preparing a single comparator for comparing the sense voltage $V_{CS}$ with a single predetermined voltage that is used as both the voltages $V_{TH}$ and $V_{OFF}$, it is possible to judge whether or not the sense voltage $V_{CS}$ has reached the short-circuit threshold voltage $V_{TH}$ or the turn-off reference voltage $V_{OFF}$.

On the other hand, setting the short-circuit threshold voltage $V_{TH}$ at a voltage lower than the turn-off reference voltage $V_{OFF}$ provides the advantage that the upper limit time $T_{TH}$ can be set to be shorter than in a case where the short-circuit threshold voltage $V_{TH}$ is made equal to the turn-off reference voltage $V_{OFF}$.

For example, when the turn-off reference voltage $V_{OFF}$ and the short-circuit threshold voltage $V_{TH}$ are both 1 V and in addition an adequate sense resistor $R_{CS}$ is provided with no short circuit, if the standard value of the on-time $T_{ON}$ in current control is 10 microseconds, the upper limit time $T_{TH}$ is set at a time longer than 10 microseconds, for example 20 microseconds, to thereby reliably turn off the switching transistor M1 in response to the sense voltage $V_{CS}$ reaching the turn-off reference voltage $V_{OFF}$ (1 V). In that case, when the sense resistor $R_{CS}$ is short-circuited, the current $I_{M1}$ continues to flow through the primary winding W1 and the switching transistor M1 for as long as 20 microseconds, and as a result, the current $I_{M1}$ may reach an excessively high current value depending on the inductance value of the primary winding W1.

In contrast, in a case where the turn-off reference voltage $V_{OFF}$ and the short-circuit threshold voltage $V_{TH}$ are set at, for example, 1 V and 0.3 V, respectively, the upper limit time $T_{TH}$ can be set at 6 microseconds (=20 microseconds×3/10). If the sense voltage $V_{CS}$ does not reach 0.3 V (the short-circuit threshold voltage $V_{TH}$) at the time point that the elapsed time $T_{TIMER}$ after the turning-on of the switching transistor M1 has reached 6 microseconds, it can be presumed that the sense resistor $R_{CS}$ is short-circuited, and by turning off the switching transistor M1 at that time point, it is possible to stop current control while the current $I_{M1}$ is low.

Here, current control may be used also in feedback control after time point t2 in FIG. 5. In that case, the following operation is possible.

Specifically, for example, the feedback circuit 30 can be configured such that a particular feedback signal $V_{FB}$ as the feedback signal $V_{FB}$ is fed to the primary-side control circuit IC 10 only when the output voltage $V_{OUT}$ is lower than the target voltage $V_{TG}$. Or, the feedback circuit 30 may be configured such that a particular feedback signal $V_{FB}$ is fed to the primary-side control circuit IC 10 after the output voltage $V_{OUT}$ becomes equal to or lower than a voltage ($V_{TG}-\Delta V$) that is lower than the target voltage $V_{TG}$ by a predetermined voltage $\Delta V$ until the output voltage $V_{OUT}$ reaches the target voltage $V_{TG}$. The control circuit 120 performs current control as discussed above when the particular feedback signal $V_{FB}$ is being fed in, and keeps the switching transistor M1 off when the particular feedback signal $V_{FB}$ is not being fed in. Thus, the switching of the switching transistor M1 is driven intermittently, and thereby the output voltage $V_{OUT}$ is kept close to the target voltage $V_{TG}$. Also in current control after time point t2, as described above, if, despite the elapsed time $T_{TIMER}$ after the turning-on time point of the switching transistor M1 having reached the predetermined upper limit time $T_{TH}$, the sense voltage $V_{CS}$ does not reach the predetermined short-circuit threshold voltage $V_{TH}$, the control circuit 120 may judge that a short circuit has occurred, and turn off the switching transistor M1 via the drive circuit 130.

Second Embodiment

A second embodiment of the present invention will be described. The second embodiment, and also the third and fourth embodiments described later, is an embodiment based on the first embodiment. Accordingly, for any feature of the second to fourth embodiments of which no particular description is given, unless inconsistent, the corresponding description of the first embodiment may apply to the second to fourth embodiments. Any feature of the second embodiment that is inconsistent with one of the first embodiment, the description of that feature of the second embodiment may prevail (the same applies to the third and fourth embodiments described later). Unless inconsistent, any two or more of the first to fourth embodiments can be combined together. Unless inconsistent, any two or more of the first to fourth embodiments and of the fifth to ninth embodiments described further on can be combined together.

In the first embodiment, the DC-DC converter 1 is configured as an isolated synchronous-rectification DC-DC converter, but the DC-DC converter 1 may be configured in any other manner so long as it generates the output voltage $V_{OUT}$ on the secondary side of the transformer TR (that is, in the secondary-side circuit) from the input voltage $V_{IN}$ applied to the primary winding W1.

For example, in the DC-DC converter 1 shown in FIG. 1, what is called a low-side application is adopted, but a high-side application may be adopted instead. If a high-side application is adopted in the DC-DC converter 1, the SR transistor M2 is provided on the output terminal P2 side, and the SR transistor M2 is inserted in series between the output terminal P2, to which the output voltage $V_{OUT}$ is applied, and the secondary winding W2 of the transformer TR. It is possible to change in any other manner the position at which the SR transistor M2 is arranged in the secondary-side circuit in a manner that does not depart from the technical concept of the present invention.

For another example, the DC-DC converter 1 may be a DC-DC converter (an isolated diode rectification DC-DC converter) using a rectification diode. In that case, in the DC-DC converter 1, instead of the SR transistor M2 and the parasite diode D2 shown in FIG. 1, a rectification diode is provided in the secondary-side circuit. The rectification diode is inserted between the secondary winding W2 and the output capacitor $C_{OUT}$, and rectifies the power propagated from the primary winding W1 to the secondary winding W2.

For another example, the DC-DC converter 1 may be configured as a forward isolated DC-DC converter, and also in that case, whichever of the synchronous-rectification type and the rectification-diode type may be adopted.

Third Embodiment

A third embodiment of the present invention will be described. The third embodiment deals with uses of an isolated DC-DC converter according to the present invention.

Figure 9:
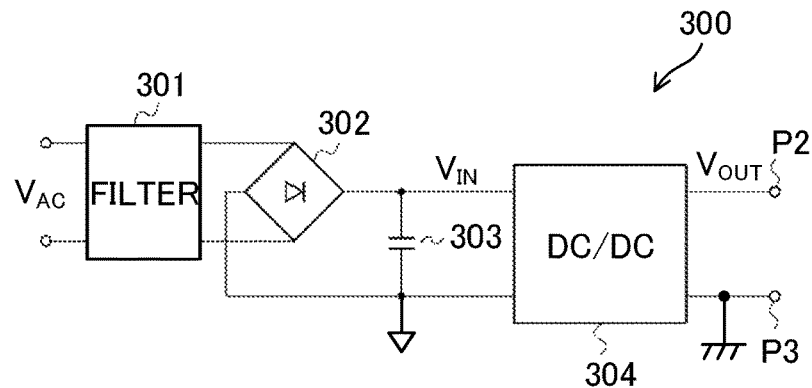
FIG. 9 is a diagram showing a configuration of an AC-DC converter according to a third embodiment of the present invention.

As shown in FIG. 9, it is possible to configure an AC-DC converter 300 which uses an isolated DC-DC converter according to the present invention. The AC-DC converter 300 includes a filter 301, a rectification circuit 302, a smoothing capacitor 303, and an isolated DC-DC converter 304. The filter 301 eliminates noise in an alternating-current voltage $V_{AC}$ fed to the AC-DC converter 300. The alternating-current voltage $V_{AC}$ can be a commercial alternating-current voltage. The rectification circuit 302 is a diode-bridge circuit which performs full-wave rectification on the alternating-current voltage $V_{AC}$ fed to it via the filter 301. The smoothing capacitor 303 smooths the full-wave rectified voltage to thereby generate a direct-current voltage. The isolated DC-DC converter 304 receives the direct-current voltage generated across the smoothing capacitor 303 as the input voltage $V_{IN}$ and performs power conversion (DC-DC conversion) on the input voltage $V_{IN}$ to thereby generate an output voltage $V_{OUT}$. The DC-DC converter 1 described in connection with the first or second embodiment can be used as the isolated DC-DC converter 304. In that case, the input capacitor $C_{IN}$ shown in FIG. 1 corresponds to the smoothing capacitor 303.

Figure 10:
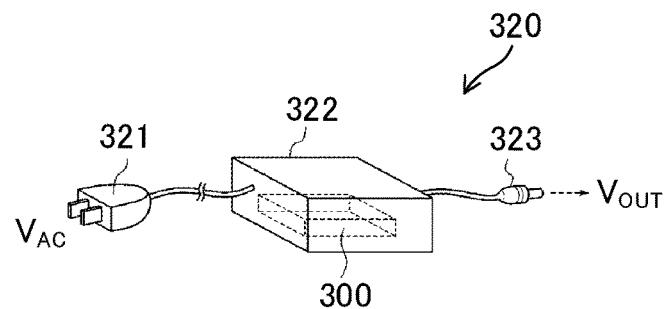
FIG. 10 is a diagram showing a configuration of a power adapter according to the third embodiment of the present invention.

It is possible to configure a power adapter by using the AC-DC converter 300. FIG. 10 is a diagram showing a power adapter 320 which includes the AC-DC converter 300. The power adapter 320 includes the AC-DC converter 300, a plug 321, a housing 322, and an output connector 323, and the AC-DC converter 300 is housed and arranged inside the housing 322. The plug 321 receives a commercial alternating-current voltage $V_{AC}$ from an unillustrated outlet, and the AC-DC converter 300 generates a direct-current output voltage $V_{OUT}$ from the commercial alternating-current voltage $V_{AC}$ fed in via the plug 321. The output voltage $V_{OUT}$ is supplied, via the output connector 323, to any unillustrated electric appliance. Examples of the electric appliance include notebook personal computers, personal digital assistants, digital cameras, digital video cameras, mobile phones (including those classified as smartphones), and mobile audio players.

Figure 11A:
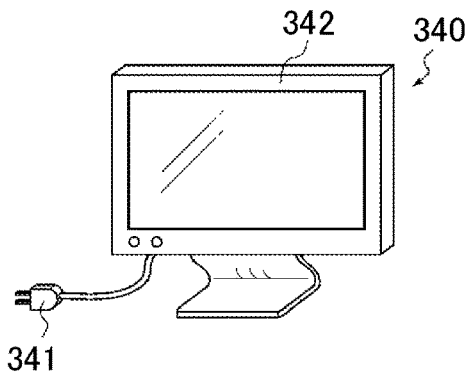
FIG. 11A and FIG. 11B are diagrams showing a configuration of an electric appliance according to the third embodiment of the present invention.
Figure 11B:
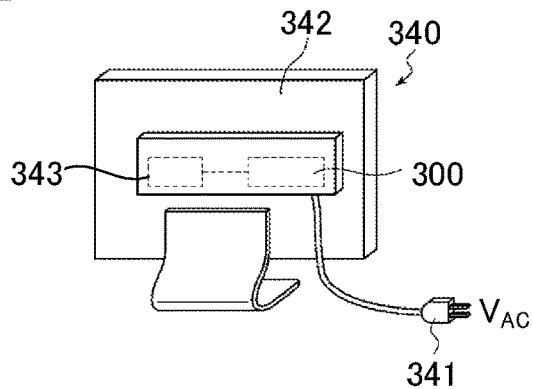

It is also possible to configure an electric appliance which includes the AC-DC converter 300. FIG. 11A and FIG. 11B are diagrams showing an electric appliance 340 including the AC-DC converter 300. The electric appliance 340 shown in FIG. 11A and FIG. 11B is a display apparatus, but there is no particular restriction on the kind of the electric appliance 340, and the electric appliance 340 may instead be an audio appliance, a refrigerator, a washing machine, a vacuum cleaner, or any other appliance that includes an AC-DC converter. The electric appliance 340 includes the AC-DC converter 300, a plug 341, a housing 342, and a load 343, and the AC-DC converter 300 and the load 343 are housed and arranged inside the housing 322. The plug 341 receives a commercial alternating-current voltage $V_{AC}$ from an unillustrated outlet, and the AC-DC converter 300 generates an output voltage $V_{OUT}$ from the commercial alternating-current voltage $V_{AC}$ fed in via the plug 341. The thus generated output voltage $V_{OUT}$ is supplied to the load 343. The load 343 may be any load that operates based on the output voltage $V_{OUT}$, such as a microcomputer, a DSP (digital signal processor), a power supply circuit, an illumination appliance, an analog circuit, or a digital circuit.

Fourth Embodiment

A fourth embodiment of the present invention will be described. The fourth embodiment deals with some modified techniques and the like applicable to the first to third embodiments.

As discussed above, the circuit elements of the primary-side control IC 10 are formed in the form of a semiconductor integrated circuit, and the semiconductor integrated circuit is enclosed in a resin housing (package) to thereby produce a semiconductor device. Instead, a plurality of discrete components may be used to build circuits equivalent to those in the primary-side control IC 10. Some of the circuit elements described above as being included in the primary-side control IC 10 may be provided outside the primary-side control IC 10 to be externally connected to the primary-side control IC 10. Reversely, some of the circuit elements described above as being provided outside the primary-side control IC 10 may be provided inside the primary-side control IC 10.

With respect to any signal or voltage, the relationship between their high and low levels may be reversed in a manner that does not depart from the technical concept discussed above.

A modification is possible in which FETs of N and P channel types are interchanged.

The primary-side control IC 10 shown in FIG. 3 functions as any switching control device which controls the turning on and off of a target switching element. Here, it is assumed that the target switching element is connected in series with a target coil and a sense resistor, and a predetermined direct-current voltage is applied to the series circuit composed of the target switching element, the target coil, and the sense resistor. Thus, during the on-period of the target switching element, as the time that elapses after the turning-on of the target switching element increases, the current that flows through the target switching element increases. The target switching element and the target coil in the primary-side control IC 10 in FIG. 1 are the switching transistor M1 and the primary winding W1, respectively. This is not meant to limit the target switching element and the target coil in the present invention, and the present invention is widely applicable to various uses where the current flowing through the target coil is controlled by driving the switching of the target switching element.

The transistors described above may each be a transistor of any kind. For example, a transistor described above as a MOSFET may be replaced with a junction FET, an IGBT (insulated-gate bipolar transistor), or a bipolar transistor. Any transistor has a first electrode, a second electrode, and a control electrode. In an FET, one of the first and second electrodes corresponds to the drain, the other of them corresponds to the source, and the control electrode corresponds to the gate. In an IGBT, one of the first and second electrodes corresponds to the collector, the other of them corresponds to the emitter, and the control electrode corresponds to the gate. In a bipolar transistor that does not belong to the IGBT, one of the first and second electrodes corresponds to the collector, the other of them corresponds to the emitter, and the control electrode corresponds to the base.

The present invention mainly assumes, as a switching element (target switching element) to be taken as the control target of the switching control device, a voltage-controlled transistor (that is, a transistor in which the current flowing between the first and second electrodes is controlled based on the voltage at the control electrode) such as an FET, which can be a MOSFET, or an IGBT, but instead a bipolar transistor may be used as the switching element (target switching element).

Fifth Embodiment

Figure 12:
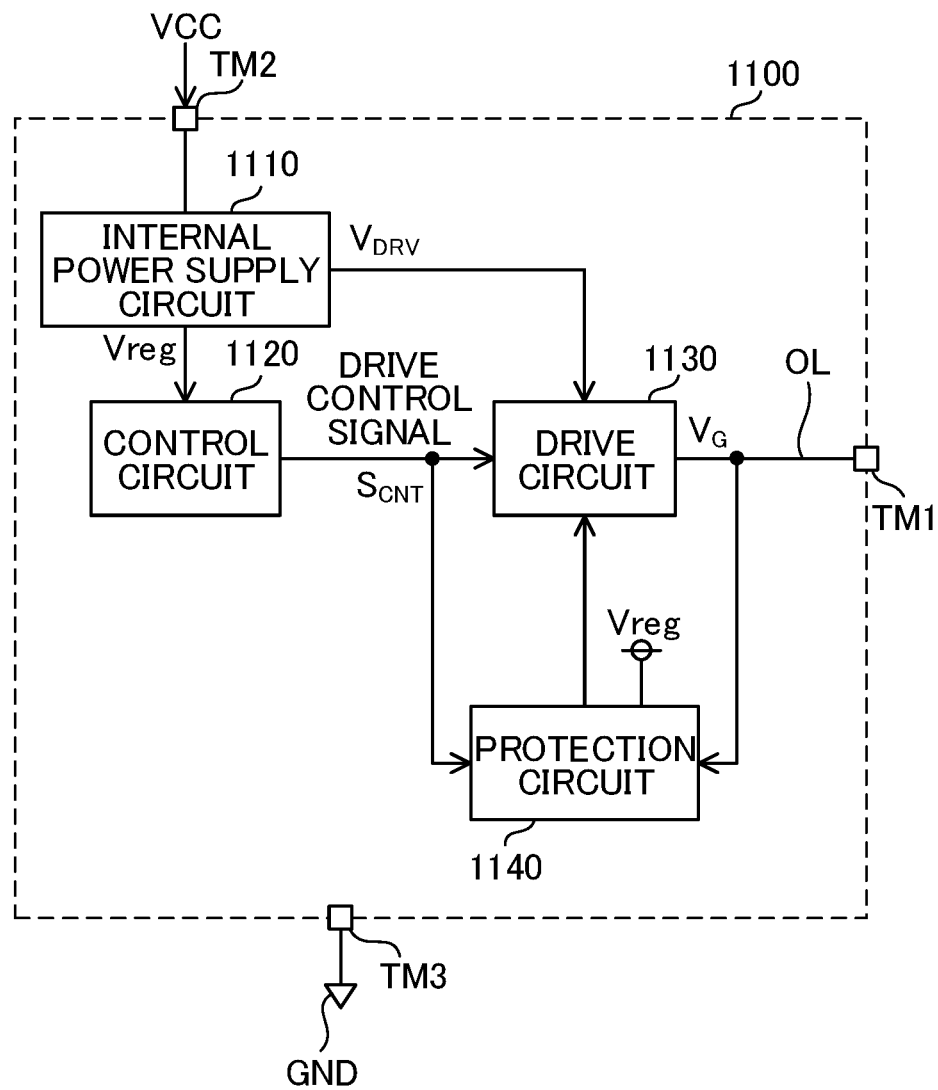
FIG. 12 is an outline block diagram of a driving device according to a fifth embodiment of the present invention.
Figure 13:
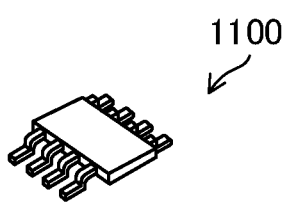
FIG. 13 is an exterior perspective view of the driving device shown in FIG. 12.

A fifth embodiment of the present invention will be described. FIG. 12 is an outline internal configuration diagram of a driving device 1100 according to the fifth embodiment of the present invention. FIG. 13 is an exterior view of the driving device 1100.

The driving device 1100 is an electronic component (semiconductor device) produced by enclosing a semiconductor integrated circuit in a resin housing (package), and the circuits constituting the driving device 1100 are integrated together using semiconductor elements. The housing of the electronic component as the driving device 1100 is provided with a plurality of external terminals exposed outside of the driving device 1100. The number of external terminals shown in FIG. 13 is merely illustrative.

As part of the plurality of external terminals provided in the driving device 1100, external terminals TM1 to TM3 are shown in FIG. 12. The external terminal TM1 is an output terminal, and for example, a transistor (not shown in FIG. 12) of which the gate is driven by the driving device 1100 is externally connected to the external terminal TM1. The external terminal TM2 is a power terminal and receives a direct-current supply voltage VCC from an unillustrated power supply circuit. The external terminal TM3 is a ground terminal, and is connected to the ground GND. The ground refers to a conductive part at a reference potential of 0 V (zero volts) (that is, a predetermined-potential point), or refers to the reference potential itself.

The driving device 1100 includes an internal power supply circuit 1110, a control circuit 1120, a drive circuit 1130, and a protection circuit 1140.

The internal power supply circuit 1110 performs DC-DC conversion on the supply voltage VCC fed to the power terminal TM2 to thereby generate one or more other direct-current voltages. Here, it is assumed that the direct-current voltages generated by the internal power supply circuit 1110 include the internal supply voltage Vreg and the driving voltage $V_{DRV}$. The internal supply voltage Vreg and the driving voltage $V_{DRV}$ are each a positive direct-current voltage with a predetermined voltage value. For example, the supply voltage VCC is a voltage of 14 V or more, and the voltages Vreg and $V_{DRV}$ are 4 V and 12 V, respectively. The control circuit 1120 and the protection circuit 1140 operate based on the internal supply voltage Vreg. The drive circuit 1130 operates based on the driving voltage $V_{DRV}$.

The control circuit 1120 is configured as a logic circuit, or as an analog circuit plus a logic circuit. The control circuit 1120 generates the drive control signal $S_{CNT}$, and feeds the drive control signal $S_{CNT}$ to the drive circuit 1130. The drive control signal $S_{CNT}$ is a binary signal which is either at high level or at low level, and can be a pulse signal with a rectangular waveform. The drive control signal $S_{CNT}$ as a pulse signal can be a signal modulated by PWM modulation (pulse width modulation) or by PFM modulation (pulse frequency modulation), and its signal level switches between low and high levels.

The drive circuit 1130 is connected to the output terminal TM1 via an output line OL, and controls the voltage level at the output terminal TM1 according to the drive control signal $S_{CNT}$. In other words, the drive circuit 1130 adjusts the voltage level at the output terminal TM1 under the control of the control circuit 1120. Hereinafter, the voltage at the output terminal TM1 is represented by "$V_G$", and will occasionally be referred to as the output terminal voltage. The drive circuit 1130 operates such that the level of the output terminal voltage $V_G$ is low level when the level of the drive control signal $S_{CNT}$ is low level, and that the level of the output terminal voltage $V_G$ is high level when the level of the drive control signal $S_{CNT}$ is high level.

The low level of the output terminal voltage $V_G$ is substantially equal to the level of the ground GND, and may be a level with a slightly higher potential than the level of the ground GND. For example, the low level of the output terminal voltage $V_G$ is a level equal to or higher than the potential at the ground GND but equal to or lower than the potential (GND+$\Delta V_1$). The potential (GND+$\Delta V_1$) refers to a potential that is higher than the potential at the ground GND by a predetermined positive voltage $\Delta V_1$ (for example, 0.5 V). In a case where a current flows out of the ground GND through the drive circuit 1130 and the output terminal TM1, the low level of the output terminal voltage $V_G$ may be a level slightly lower than the level of the ground GND.

The high level of the output terminal voltage $V_G$ is substantially equal to the level of the driving voltage $V_{DRV}$, and may be a level with a slightly lower potential than the level of the driving voltage $V_{DRV}$. For example, the high level of the output terminal voltage $V_G$ is a level equal to or lower than the driving voltage $V_{DRV}$ but equal to or higher than the potential ($V_{DRV}-\Delta V_2$). The potential ($V_{DRV}-\Delta V_2$) refers to a potential that is lower than the potential of the driving voltage $V_{DAV}$ by a predetermined positive voltage $\Delta V_2$ (for example, 0.5 V). In a case where a current flows from the output terminal TM1 through the drive circuit 1130 into a line to which the driving voltage $V_{DAV}$ is applied, the high level of the output terminal voltage $V_G$ may be a level with a slightly higher potential than the level of the driving voltage $V_{DRV}$. In any case, the high level of the output terminal voltage $V_G$ is higher than the low level of the output terminal voltage $V_G$. Accordingly, the potential ($V_{DRV}-\Delta V_2$) is higher than the potential (GND+$\Delta V_1$).

The protection circuit 1140 has a function of monitoring the output terminal voltage $V_G$, and based on the state of the drive circuit 1130 and on the output terminal voltage $V_G$, the protection circuit 1140 detects faults such as a power short circuit and a ground short circuit. Thus, the term "protection circuit" may be read as "fault detection circuit". The protection circuit 1140 can refer to the drive control signal $S_{CNT}$ in order to find the state of the drive circuit 1130.

Figure 14A:
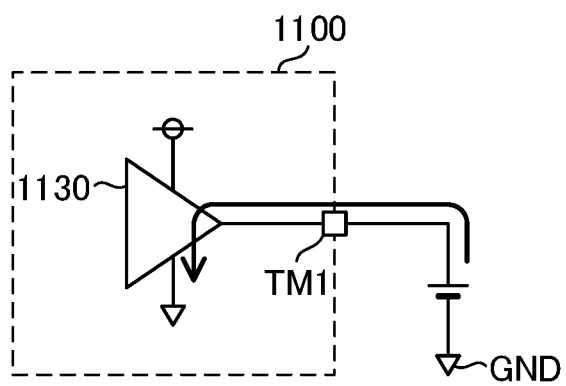
FIG. 14A and FIG. 14B are diagrams illustrating short circuits to the supplied power and to the ground, respectively, in connection with the driving device in the fifth embodiment of the present invention.

A power short circuit refers to, for example, a situation where, as shown in FIG. 14A, a voltage source that outputs a positive voltage with a considerably low output impedance is short-circuited to the output terminal TM1. For example, a situation where the power terminal TM2 is short-circuited to the output terminal TM1 is a power short circuit. In case of a power short circuit, depending on the state of the drive circuit 1130, there is a risk of an excessive current continuously flowing in from the output terminal TM1 through the output line OL toward the drive circuit 1130.

Figure 14B:
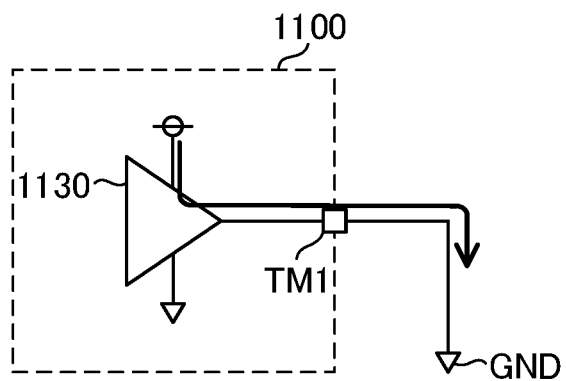

A ground short circuit refers to, for example, a situation where, as shown in FIG. 14B, the ground GND is short-circuited to the output terminal TM1 or a situation where a voltage source that outputs a negative voltage with a considerably low output impedance is short-circuited to the output terminal TM1. In case of a ground short circuit, depending on the state of the drive circuit 1130, there is a risk of an excessive current continuously flowing out from the drive circuit 1130 through the output line OL toward the output terminal TM1.

To cope with such faults, on judging that a power short circuit or a ground short circuit is occurring, the protection circuit 1140 performs protection operation to turn the drive circuit 1130 to a high-impedance state (hereinafter referred to as the Hi-Z state) regardless of the drive control signal $S_{CNT}$. Here, the impedance of the drive circuit 1130 refers to the impedance of the drive circuit 1130 as seen from the output terminal TM1 and the output line OL. Turning the drive circuit 1130 to the Hi-Z state helps suppress the input or output of an excessive current even when a power short circuit or a ground short circuit is occurring, and it is thus possible to suppress destruction of or damage to the driving device 1100 including the drive circuit 1130.

The fifth embodiment includes examples EX5_1 to EX5_3 described below. Examples EX5_1 to EX5_3 deal with examples of the configuration and the operation of the drive circuit 1130 and the protection circuit 1140.

Example EX5_1

Figure 15:
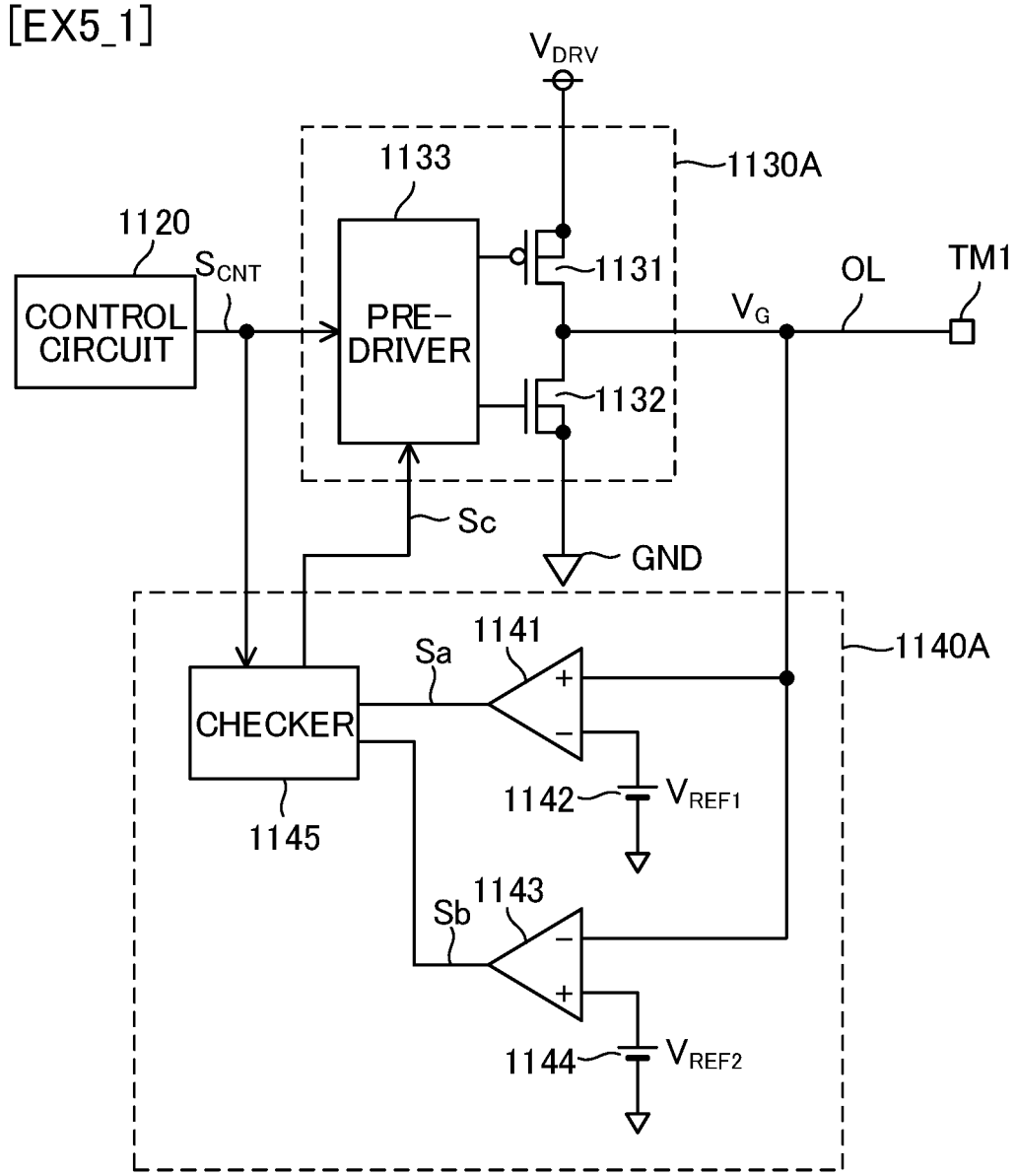
FIG. 15 is a diagram showing a configuration example (EX5_1) of a drive circuit and a protection circuit in the fifth embodiment of the present invention.

Example EX5_1 will be described. FIG. 15 shows the configuration of a drive circuit 1130A and a protection circuit 1140A according to example EX5_1. In example EX5_1, the drive circuit 1130A and the protection circuit 1140A in FIG. 15 are used as the drive circuit 1130 and the protection circuit 1140 in FIG. 12.

The drive circuit 1130A in FIG. 15 includes transistors 1131 and 1132, which are connected in series with each other, and a pre-driver 1133. The transistor 1131 is configured as a P-channel MOSFET, and the transistor 1132 is configured as an N-channel MOSFET. A modification is possible where the transistor 1131 is configured as an N-channel MOSFET. To the series circuit composed of the transistors 1131 and 1132, the driving voltage $V_{DRV}$ is applied. More specifically, the driving voltage $V_{DRV}$ is applied to the source of the transistor 1131, the drains of the transistors 1131 and 1132 are connected together, and the source of the transistor 1132 is connected to the ground GND. The connection node between the drains of the transistors 1131 and 1132 is connected to the output line OL and to the output terminal TM1.

The pre-driver 1133 receives the drive control signal $S_{CNT}$ from the control circuit 1120 and a fault signal Sc from the protection circuit 1140A. A low-level fault signal Sc indicates that neither a power short circuit nor a ground short circuit is detected. When the fault signal Sc is at low level, the pre-driver 1133 controls the turning on and off of the transistors 1131 and 1132 according to the drive control signal $S_{CNT}$ from the control circuit 1120.

Specifically, when the fault signal Sc is at low level and the drive control signal $S_{CNT}$ is at low level, the pre-driver 1133 feeds a high-level signal to the gates of the transistors 1131 and 1132 to thereby turn off and on the transistors 1131 and 1132, respectively. In the drive circuit 1130A, the state where the transistors 1131 and 1132 are off and on, respectively, will be referred to as the low-output state (a first state). When the drive circuit 1130A is in the low-output state, if there is no fault occurring, the level of the output terminal voltage $V_G$ is low level (here, the transient state is ignored).

When the fault signal Sc is at low level and the drive control signal $S_{CNT}$ is at high level, the pre-driver 1133 feeds a low-level signal to the gates of the transistors 1131 and 1132 to thereby turn on and off the transistors 1131 and 1132, respectively. In the drive circuit 1130A, the state where the transistors 1131 and 1132 are on and off, respectively, will be referred to as the high-output state (a second state). When the drive circuit 1130A is in the high-output state, if there is no fault occurring, the level of the output terminal voltage $V_G$ is high level (here, the transient state is ignored).

Here, to prevent the transistors 1131 and 1132 from being in the on state simultaneously, the pre-driver 1133 may as necessary insert a dead time in which the transistors 1131 and 1132 are both in the off state.

Figure 16:
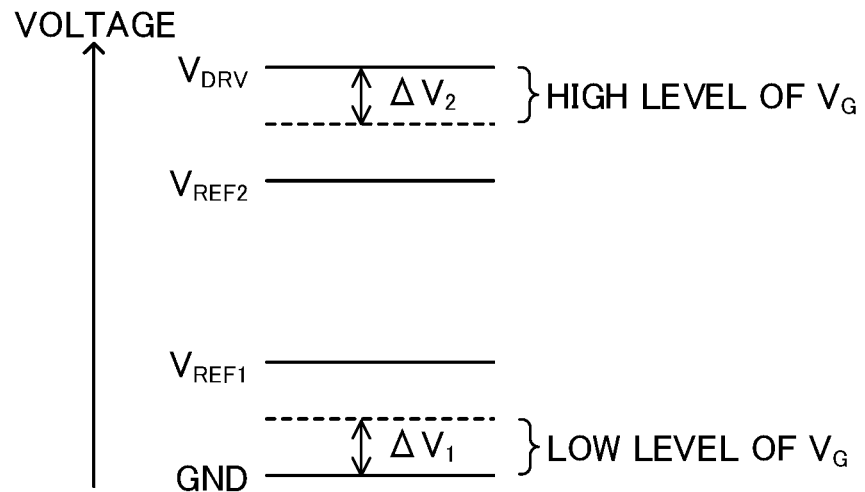
FIG. 16 is a diagram showing a relationship between the high and low levels of an output-terminal voltage and two threshold voltages in the fifth embodiment of the present invention.

The protection circuit 1140A includes comparators 1141 and 1143, voltage sources 1142 and 1144, and a checker 1145. The voltage source 1142 generates and outputs a predetermined threshold voltage $V_{REF1}$. The voltage source 1144 generates and outputs a predetermined threshold voltage $V_{REF2}$. The threshold voltages $V_{REF1}$ and $V_{REF2}$ each have a predetermined positive direct-current voltage value. FIG. 16 shows the level relationship of the high and low levels of the output-terminal voltage $V_G$ with respect to the threshold voltages $V_{REF1}$ and $V_{REF2}$.

The threshold voltage $V_{REF1}$ is a threshold voltage for detecting a power short circuit, and is at least higher than the low level of the output terminal voltage $V_G$. That is, as mentioned previously, when the low level of the output terminal voltage $V_G$ is equal to or higher than the potential at the ground GND but equal to or lower than the potential (GND+$\Delta V_1$), the threshold voltage $V_{REF1}$ is at least higher than the potential (GND+$\Delta V_1$). For example, when the potential (GND+$\Delta V_1$) is 0.5 V, the threshold voltage $V_{REF1}$ is set at 1.5 V.

The threshold voltage $V_{REF2}$ is a threshold voltage for detecting a ground short circuit, and is at least lower than the high level of the output terminal voltage $V_G$. That is, when, as mentioned previously, the high level of the output terminal voltage $V_G$ is equal to or lower than the driving voltage $V_{DRV}$ but equal to or higher than the potential ($V_{DRV}$ $\Delta V_2$), the threshold voltage $V_{REF2}$ is at least lower than the potential ($V_{DRV}-\Delta V_2$). For example, when the potential ($V_{DRV}-\Delta V_2$) is 11.5 V, the threshold voltage $V_{REF2}$ is set at 10.5 V.

It should be noted that although, generally, the threshold voltage $V_{REF2}$ is assumed to be set higher than the threshold voltage $V_{REF1}$, this is not meant to limit the present invention. It should also be noted that although, here, the threshold voltages $V_{REF1}$ and $V_{REF2}$ are assumed to be mutually different voltages, the threshold voltages $V_{REF1}$ and $V_{REF2}$ may be equal to each other. In that case, a single voltage source can be used as both the voltage sources 1142 and 1144, and the threshold voltage generated by the single voltage source can be used as the threshold voltages $V_{REF1}$ and $V_{REF2}$.

To the non-inverting input terminal and the inverting input terminal of the comparator 1141, the output terminal voltage $V_G$ and the threshold voltage $V_{REF1}$, respectively, are fed, and the comparator 1141 outputs a signal Sa reflecting the result of comparison between the voltages $V_G$ and $V_{REF1}$. Specifically, the comparator 1141 outputs a high-level signal Sa when the output terminal voltage $V_G$ is higher than the threshold voltage $V_{REF1}$, and the comparator 1141 outputs a low-level signal Sa when the output terminal voltage $V_G$ is lower than the threshold voltage $V_{REF1}$. When the output terminal voltage $V_G$ is just equal to the threshold voltage $V_{REF1}$, the signal Sa is at either low or high level.

To the inverting input terminal and the non-inverting input terminal of the comparator 1143, the output terminal voltage $V_G$ and the threshold voltage $V_{REF2}$, respectively, are fed, and the comparator 1143 outputs a signal Sb reflecting the result of comparison between the voltages $V_G$ and $V_{REF2}$. Specifically, the comparator 1143 outputs a high-level signal Sb when the output terminal voltage $V_G$ is lower than the threshold voltage $V_{REF2}$, and the comparator 1143 outputs a low-level signal Sb when the output terminal voltage $V_G$ is higher than the threshold voltage $V_{REF2}$. When the output terminal voltage $V_G$ is just equal to the threshold voltage $V_{REF2}$, the signal Sb is at either low or high level.

The checker 1145 receives the drive control signal $S_{CNT}$ from the control circuit 1120 and the signals Sa and Sb from the comparators 1141 and 1143, and based on these signals, the checker 1145 judges whether or not a power short circuit or a ground short circuit has occurred, and outputs the fault signal Sc which indicates the result of the judgment. If, in the protection circuit 1140A, it is not judged that either a power short circuit or a ground short circuit is occurring, the fault signal Sc is at low level.

If the drive circuit 1130A is in the low-output state with no power short circuit occurring, the output terminal voltage $V_G$ should be at a correspondingly low level, that is, at low level. If, for the sake of discussion, the drive circuit 1130A is in the low-output state with a power short circuit occurring, a comparatively high current ascribable to the power short circuit flows through the transistor 1132, and thus the output terminal voltage $V_G$, which is proportional to the drain current of the transistor 1132, is expected to be equal to or higher than the threshold voltage $V_{REF1}$. Based on this, whether a power short circuit is being detected is judged. Here, to eliminate the influence of noise and transient response, the checker 1145 is provided with a timer for use in detection of a power short circuit.

Specifically, if, despite a predetermined time $T_{TH1}$ having elapsed after the drive control signal $S_{CNT}$ turning from high level to low level, the signal Sa is at high level (that is, if, despite the predetermined time $T_{TH1}$ having elapsed after the state of the drive circuit 1130A turning from the high-output state to the low-output state, the output terminal voltage $V_G$ does not fall to or below the threshold voltage $V_{REF1}$), the checker 1145 judges that a power short circuit is occurring. On judging that a power short circuit is occurring, the checker 1145 raises the fault signal Sc to high level.

If the drive circuit 1130A is in the high-output state with no ground short circuit occurring, the output terminal voltage $V_G$ should be at a correspondingly high level, that is, at high level. If, for the sake of discussion, the drive circuit 1130A is in the high-output state with a ground short circuit occurring, a comparatively high current ascribable to the ground short circuit flows through the transistor 1131, and thus the output terminal voltage $V_G$, which is dependent on the drain current of the transistor 1131, is expected to be equal to or lower than the threshold voltage $V_{REF2}$. Based on this, whether a ground short circuit is being detected is judged. Here, to eliminate the influence of noise and transient response, the checker 1145 is provided with a timer for use in detection of a ground short circuit.

Specifically, if, despite a predetermined time $T_{TH2}$ having elapsed after the drive control signal $S_{CNT}$ turning from low level to high level, the signal Sb is at high level (that is, if, despite the predetermined time $T_{TH2}$ having elapsed after the state of the drive circuit 1130A turning from the low-output state to the high-output state, the output terminal voltage $V_G$ does not rise to or above the threshold voltage $V_{REF2}$), the checker 1145 judges that a ground short circuit is occurring. On judging that a ground short circuit is occurring, the checker 1145 raises the fault signal Sc to high level. The predetermined times $T_{TH1}$ and $T_{TH2}$ mentioned above may be equal to each other, or may be different from each other.

Once the fault signal Sc is turned to high level, from then on until a predetermined reset signal is fed to the driving device 1100 including the drive circuit 1130A and the protection circuit 1140A or until the input of the supply voltage VCC to the driving device 1100 is cut off, the fault signal Sc is kept at high level. Or, the fault signal Sc may be turned back to low level when a predetermined cool-down time has elapsed after the turning of the fault signal Sc from low level to high level.

When the fault signal Sc is at high level, the drive circuit 1130A is kept in the Hi-Z state regardless of the drive control signal $S_{CNT}$. Specifically, on judging that a power short circuit or a ground short circuit is occurring, by outputting a high-level fault signal Sc, the protection circuit 1140A performs protection operation to turn the drive circuit 1130A to the Hi-Z state (a third state) regardless of the drive control signal $S_{CNT}$. The Hi-Z state of the drive circuit 1130A refers to a state where the transistors 1131 and 1132 are both off.

When either the transistor 1131 or 1132 is on, the impedance of the drive circuit 1130A as seen from the output terminal TM1 and the output line OL is sufficiently low (for example, several hundred milliohms). In contrast, when the transistors 1131 and 1132 are both off, the impedance of the drive circuit 1130A as seen from the output terminal TM1 and the output line OL is far higher (for example, several hundred megohms) than when either the transistor 1131 or 1132 is on. This helps suppress continuous input or output of an excessive current even when a power short circuit or a ground short circuit is occurring, and it is thus possible to suppress destruction of or damage to the driving device 1100 including the drive circuit 1130A.

In FIG. 15, the control circuit 1120 and the protection circuit 1140A can be said to constitute a state controller which controls the state of the drive circuit 1130A, and by the state controller, the drive circuit 1130A is controlled to be in one of the low-output state (first state), the high-output state (second state), and the Hi-Z state (third state). If, despite the predetermined time $T_{TH1}$ having elapsed after the state of the drive circuit 1130A turning from the high-output state to the low-output state, the output terminal voltage $V_G$ does not fall to or below the threshold voltage $V_{REF1}$, or if, despite the predetermined time $T_{TH2}$ having elapsed after the state of the drive circuit 1130A turning from the low-output state to the high-output state, the output terminal voltage $V_G$ does not rise to or above the threshold voltage $V_{REF2}$, the state controller turns the drive circuit 1130A to the Hi-Z state.

Although, in FIG. 15, a configuration where the fault signal Sc is fed to the pre-driver 1133 is adopted, the fault signal Sc can be fed not to the pre-driver 1133 but to the control circuit 1120 so that, when the fault signal Sc is at high level, the control circuit 1120 acts as the leading agent of protection operation to turn the drive circuit 1130A to the Hi-Z state.

In example EX5_1, only power short circuit protection or only ground short circuit protection may be performed. In a case where only power short circuit protection is performed, in the protection circuit 1140A, the comparator 1143 and the voltage source 1144 are omitted, and the signal Sb is regarded as being constantly at low level. Reversely, in a case where only ground short circuit protection is performed, in the protection circuit 1140A, the comparator 1141 and the voltage source 1142 are omitted, and the signal Sa is regarded as being constantly at low level.

Example EX5_2

Figure 17:
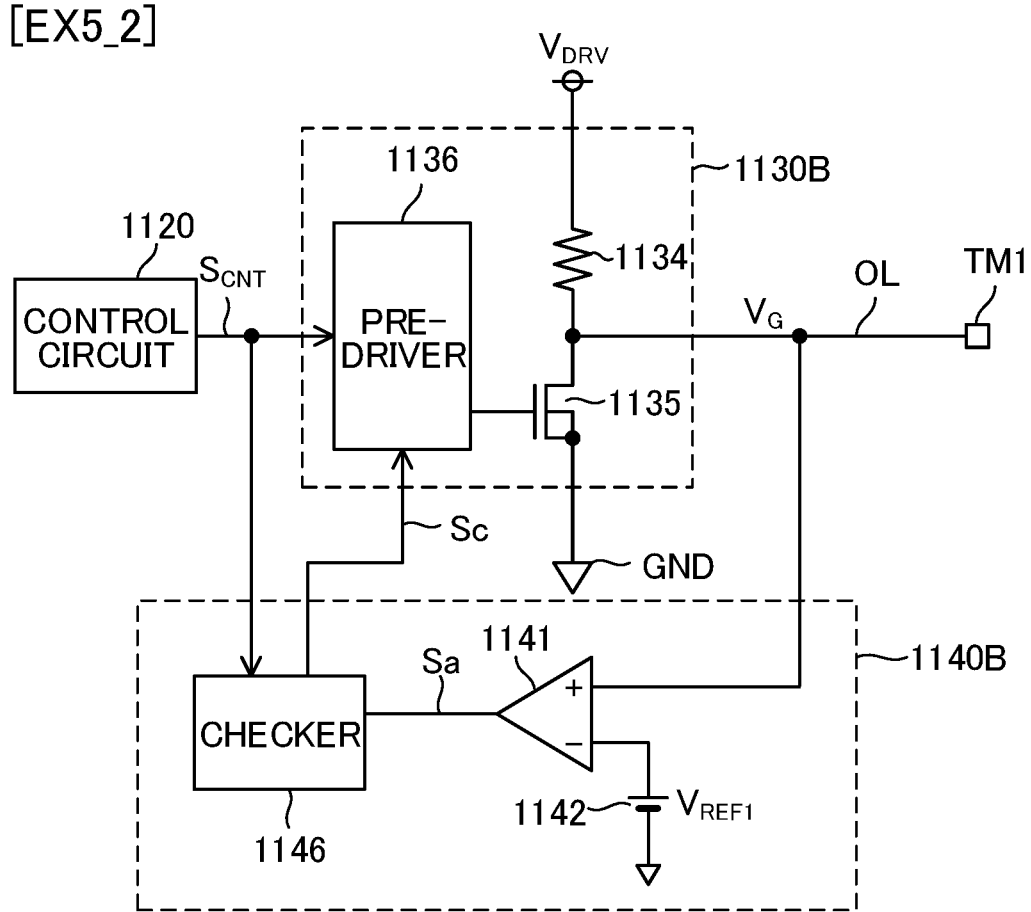
FIG. 17 is a diagram showing another configuration example (EX5_2) of a drive circuit and a protection circuit in the fifth embodiment of the present invention.

Example EX5_2 will be described. FIG. 17 shows a configuration of a drive circuit 1130B and a protection circuit 1140B according to example EX5_2. In example EX5_2, the drive circuit 1130B and the protection circuit 1140B in FIG. 17 are used as the drive circuit 1130 and the protection circuit 1140 in FIG. 12.

The drive circuit 1130B in FIG. 17 includes a pull-up resistor 1134 and a transistor 1135, which are connected in series with each other, and a pre-driver 1136. The transistor 1135 is configured as an N-channel MOSFET. The resistance value of the pull-up resistor 1134 (for example, several hundred ohms to several hundred kilohms) is considerably higher than the on-resistance value of the transistor 1135 (for example, several hundred milliohms). To the series circuit composed of the pull-up resistor 1134 and the transistor 1135, the driving voltage $V_{DRV}$ is applied. More specifically, the driving voltage $V_{DRV}$ is applied to one end of the pull-up resistor 1134, the other end of the pull-up resistor 1134 and the drain of the transistor 1135 are connected together, and the source of the transistor 1135 is connected to the ground GND. The connection node between the other end of the pull-up resistor 1134 and the drain of the transistor 1135 is connected to the output line OL and to the output terminal TM1.

The pre-driver 1136 receives the drive control signal $S_{CNT}$ from the control circuit 1120 and the fault signal Sc from the protection circuit 1140B. A low-level fault signal Sc indicates that no power short circuit is detected. When the fault signal Sc is at low level, the pre-driver 1136 controls the turning on and off of the transistor 1135 according to the drive control signal $S_{CNT}$ from the control circuit 1120.

Specifically, when the fault signal Sc is at low level and the drive control signal $S_{CNT}$ is at low level, the pre-driver 1136 feeds a high-level signal to the transistor 1135 to thereby turn on the transistor 1135. In the drive circuit 1130B, the state where the transistor 1135 is on corresponds to the low-output state (a first state). When the drive circuit 1130B is in the low-output state, if there is no fault occurring, the level of the output terminal voltage $V_G$ is low level (here, the transient state is ignored).

When the fault signal Sc is at low level and the drive control signal $S_{CNT}$ is at high level, the pre-driver 1136 feeds a low-level signal to the transistor 1135 to thereby turn off the transistor 1135. In the drive circuit 1130B, the state where the transistor 1135 is off corresponds to the high-output state (a second state). When the drive circuit 1130B is in the high-output state, if there is no fault occurring, the level of the output terminal voltage $V_G$ is high level (here, the transient state is ignored). Here, it is assumed that a component that does not constantly draw in a current via the pull-up resistor 1134 is connected to the output terminal TM1 (for example, the gate of a MOSFET provided outside the driving device 1100 can be connected to the output terminal TM1).

The protection circuit 1140B includes a comparator 1141, a voltage source 1142, and a checker 1146. The comparator 1141 and the voltage source 1142 in the protection circuit 1140B are the same as the comparator 1141 and the voltage source 1142, respectively, in the protection circuit 1140A (see FIG. 15), and thus the description of the comparator 1141 and the voltage source 1142 given in connection with Example EX5_1 applies also to example EX5_2.

Thus, the comparator 1141 outputs a high-level signal Sa when the output terminal voltage $V_G$ is higher than the threshold voltage $V_{REF1}$, and the comparator 1141 outputs a low-level signal Sa when the output terminal voltage $V_G$ is lower than the threshold voltage $V_{REF1}$. When the output terminal voltage $V_G$ is just equal to the threshold voltage $V_{REF1}$, the signal Sa is at either low or high level.

The checker 1146 receives the drive control signal $S_{CNT}$ from the control circuit 1120 and the signal Sa from the comparator 1141, and based on these signals, the checker 1146 judges whether or not a power short circuit has occurred, and outputs the fault signal Sc which indicates the result of the judgment. If, in the protection circuit 1140B, it is not judged that a power short circuit is occurring, the fault signal Sc is at low level.

If the drive circuit 1130B is in the low-output state with no power short circuit occurring, the output terminal voltage $V_G$ should be at a correspondingly low level, that is, at low level. If, for the sake of discussion, the drive circuit 1130B is in the low-output state with a power short circuit occurring, a comparatively high current ascribable to the power short circuit flows through the transistor 1135, and thus the output terminal voltage $V_G$, which is proportional to the drain current of the transistor 1135, is expected to be equal to or higher than the threshold voltage $V_{REF1}$. Based on this, whether a power short circuit is being detected is judged. Here, to eliminate the influence of noise and transient response, the checker 1146 is provided with a timer for use in detection of a power short circuit.

Specifically, if, despite the predetermined time $T_{TH1}$ having elapsed after the drive control signal $S_{CNT}$ turning from high level to low level, the signal Sa is at high level (that is, if, despite the predetermined time $T_{TH1}$ having elapsed after the state of the drive circuit 1130B turning from the high-output state to the low-output state, the output terminal voltage $V_G$ does not fall to or below the threshold voltage $V_{REF1}$), the checker 1146 judges that a power short circuit is occurring. On judging that a power short circuit is occurring, the checker 1146 raises the fault signal Sc to high level.

Once the fault signal Sc is turned to high level, from then on until a predetermined reset signal is fed to the driving device 1100 including the drive circuit 1130B and the protection circuit 1140B or until the input of the supply voltage VCC to the driving device 1100 is cut off, the fault signal Sc is kept at high level. Or, the fault signal Sc may be turned back to low level when a predetermined cool-down time has elapsed after the turning of the fault signal Sc from low level to high level.

When the fault signal Sc is at high level, the drive circuit 1130B is kept in the high-output state regardless of the drive control signal $S_{CNT}$. Specifically, on judging that a power short circuit is occurring, by outputting a high-level fault signal Sc, the protection circuit 1140B performs protection operation to turn the drive circuit 1130B to the high-output state (the second state) regardless of the drive control signal $S_{CNT}$.

When the transistor 1135 is on, the impedance of the drive circuit 1130B as seen from the output terminal TM1 and the output line OL is sufficiently low (for example, several hundred milliohms). In contrast, when the transistor 1135 is off, the impedance of the drive circuit 1130B as seen from the output terminal TM1 and the output line OL is far higher than when the transistor 1135 is on (the impedance is equal to the resistance value of the pull-up resistor 1134). This helps suppress continuous input or output of an excessive current even if a power short circuit is occurring, and it is thus possible to suppress destruction of or damage to the driving device 1100 including the drive circuit 1130B.

In FIG. 17, the control circuit 1120 and the protection circuit 1140B can be said to constitute a state controller which controls the state of the drive circuit 1130B, and by the state controller, the drive circuit 1130B is controlled to be in one of the low-output state (the first state) and the high-output state (the second state). If, despite the predetermined time $T_{TH1}$ having elapsed after the state of the drive circuit 1130B turning from the high-output state to the low-output state, the output terminal voltage $V_G$ does not fall to or below the threshold voltage $V_{REF1}$, the state controller turns the drive circuit 1130B to the high-output state.

Although, in FIG. 17, a configuration where the fault signal Sc is fed to the pre-driver 1136 is adopted, the fault signal Sc can be fed not to the pre-driver 1136 but to the control circuit 1120 so that, when the fault signal Sc is at high level, the control circuit 1120 acts as the leading agent of protection operation to turn the drive circuit 1130B to the high-output state.

Example EX5_3

Figure 18:
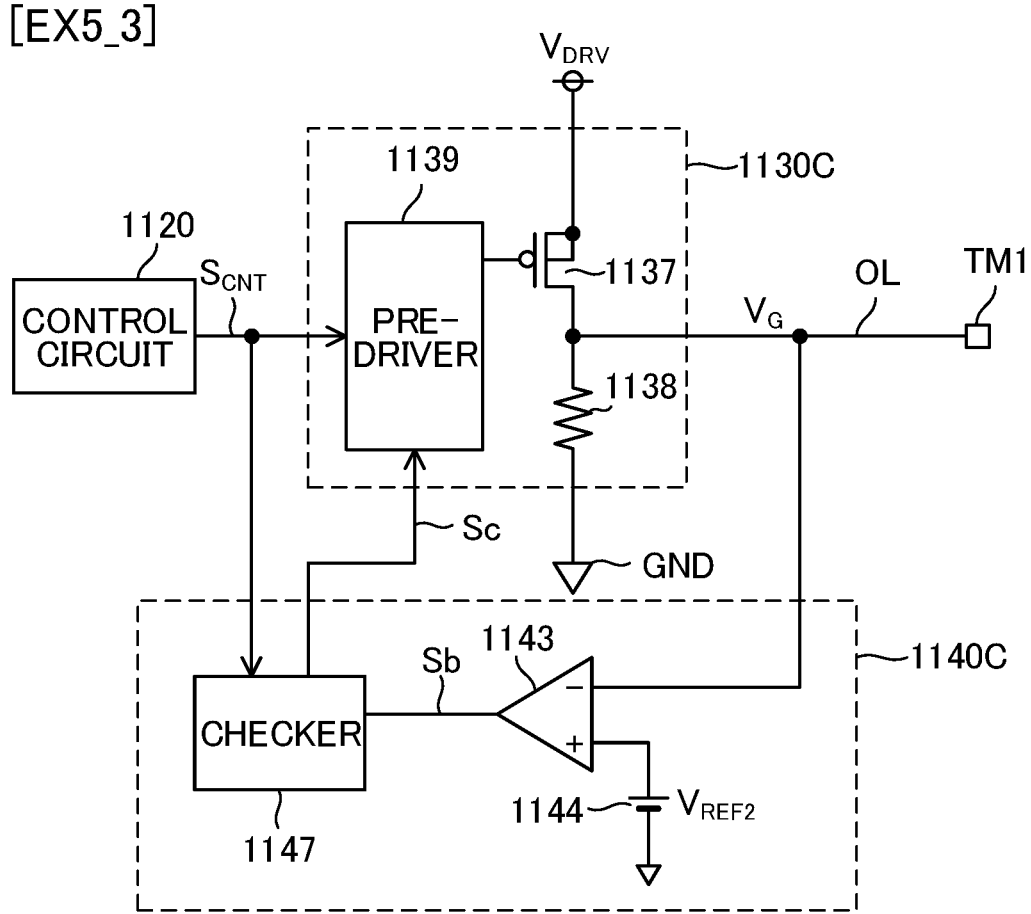
FIG. 18 is a diagram showing still another configuration example (EX5_3) of a drive circuit and a protection circuit in the fifth embodiment of the present invention.

Example EX5_3 will be described. FIG. 18 shows a configuration of a drive circuit 1130C and a protection circuit 1140C according to example EX5_3. In example EX5_3, the drive circuit 1130C and the protection circuit 1140C in FIG. 18 are used as the drive circuit 1130 and the protection circuit 1140 in FIG. 12.

The drive circuit 1130C in FIG. 18 includes a transistor 1137 and a pull-down resistor 1138, which are connected in series with each other, and a pre-driver 1139. The transistor 1137 is configured as a P-channel MOSFET. A modification is possible where the transistor 1137 is configured as an N-channel MOSFET. The resistance value of the pull-down resistor 1138 (for example, several hundred ohms to several hundred kilohms) is considerably higher than the on-resistance value of the transistor 1137 (for example, several hundred milliohms). To the series circuit composed of the transistor 1137 and the pull-down resistor 1138, the driving voltage $V_{DRV}$ is applied. More specifically, the driving voltage $V_{DRV}$ is applied to the source of the transistor 1137, the drain of the transistor 1137 and one end of the pull-down resistor 1138 are connected together, and the other end of the pull-down resistor 1138 is connected to the ground GND. The connection node between the drain of the transistor 1137 and the one end of the pull-down resistor 1138 is connected to the output line OL and to the output terminal TM1.

The pre-driver 1139 receives the drive control signal $S_{CNT}$ from the control circuit 1120 and the fault signal Sc from the protection circuit 1140C. A low-level fault signal Sc indicates that no ground short circuit is detected. When the fault signal Sc is at low level, the pre-driver 1139 controls the turning on and off of the transistor 1137 according to the drive control signal $S_{CNT}$ from the control circuit 1120.

Specifically, when the fault signal Sc is at low level and the drive control signal $S_{CNT}$ is at low level, the pre-driver 1139 feeds a high-level signal to the transistor 1137 to thereby turn off the transistor 1137. In the drive circuit 1130C, the state where the transistor 1137 is off corresponds to the low-output state (a first state). When the drive circuit 1130C is in the low-output state, if there is no fault occurring, the level of the output terminal voltage $V_G$ is low level (here, the transient state is ignored). Here, it is assumed that a component that does not constantly pass a current toward the ground GND via the pull-up resistor 1138 is connected to the output terminal TM1 (for example, the gate of a MOSFET provided outside the driving device 1100 is connected to the output terminal TM1).

When the fault signal Sc is at low level and the drive control signal $S_{CNT}$ is at high level, the pre-driver 1139 feeds a low-level signal to the transistor 1137 to thereby turn on the transistor 1137. In the drive circuit 1130C, the state where the transistor 1137 is on corresponds to the high-output state (a second state). When the drive circuit 1130C is in the high-output state, if there is no fault occurring, the level of the output terminal voltage $V_G$ is high level (here, the transient state is ignored).

The protection circuit 1140C includes a comparator 1143, a voltage source 1144, and a checker 1147. The comparator 1143 and the voltage source 1144 in the protection circuit 1140C are the same as the comparator 1143 and the voltage source 1144, respectively, in the protection circuit 1140A (see FIG. 15), and thus the description of the comparator 1143 and the voltage source 1144 given in connection with Example EX5_1 applies also to example EX5_3.

Thus, the comparator 1143 outputs a high-level signal Sb when the output terminal voltage $V_G$ is lower than the threshold voltage $V_{REF2}$, and the comparator 1143 outputs a low-level signal Sb when the output terminal voltage $V_G$ is higher than the threshold voltage $V_{REF2}$. When the output terminal voltage $V_G$ is just equal to the threshold voltage $V_{REF2}$, the signal Sb is at either low or high level.

The checker 1147 receives the drive control signal $S_{CNT}$ from the control circuit 1120 and the signal Sb from the comparator 1143, and based on these signals, the checker 1147 judges whether or not a ground short circuit has occurred, and outputs the fault signal Sc which indicates the result of the judgment. If, in the protection circuit 1140C, it is not judged that a ground short circuit is occurring, the fault signal Sc is at low level.

If the drive circuit 1130C is in the high-output state with no ground short circuit occurring, the output terminal voltage $V_G$ should be at a correspondingly high level, that is, at high level. If, for the sake of discussion, the drive circuit 1130C is in the high-output state with a ground short circuit occurring, a comparatively high current ascribable to the ground short circuit flows through the transistor 1137, and thus the output terminal voltage $V_G$, which is proportional to the drain current of the transistor 1137, is expected to be equal to or lower than the threshold voltage $V_{REF2}$. Based on this, whether a ground short circuit is being detected is judged. Here, to eliminate the influence of noise and transient response, the checker 1147 is provided with a timer for use in detection of a ground short circuit.

Specifically, if, despite the predetermined time $T_{TH2}$ having elapsed after the drive control signal $S_{CNT}$ turning from low level to high level, the signal Sb is at high level (that is, if, despite the predetermined time $T_{TH2}$ having elapsed after the state of the drive circuit 1130C turning from the low-output state to the high-output state, the output terminal voltage $V_G$ does not rise to or above the threshold voltage $V_{REF2}$), the checker 1147 judges that a ground short circuit is occurring. On judging that a ground short circuit is occurring, the checker 1147 raises the fault signal Sc to high level.

Once the fault signal Sc is turned to high level, from then on until a predetermined reset signal is fed to the driving device 1100 including the drive circuit 1130C and the protection circuit 1140C or until the input of the supply voltage VCC to the driving device 1100 is cut off, the fault signal Sc is kept at high level. Or, the fault signal Sc may be turned back to low level when a predetermined cool-down time has elapsed after the turning of the fault signal Sc from low level to high level.

When the fault signal Sc is at high level, the drive circuit 1130C is kept in the low-output state regardless of the drive control signal $S_{CNT}$. Specifically, on judging that a ground short circuit is occurring, by outputting a high-level fault signal Sc, the protection circuit 1140C performs protection operation to turn the drive circuit 1130C to the low-output state (the first state) regardless of the drive control signal $S_{CNT}$.

When the transistor 1137 is on, the impedance of the drive circuit 1130C as seen from the output terminal TM1 and the output line OL is sufficiently low (for example, several hundred milliohms). In contrast, when the transistor 1137 is off, the impedance of the drive circuit 1130C as seen from the output terminal TM1 and the output line OL is far higher than when the transistor 1137 is on (the impedance is equal to the resistance value of the pull-down resistor 1138). This helps suppress continuous input or output of an excessive current even if a ground short circuit is occurring, and it is thus possible to suppress destruction of or damage to the driving device 1100 including the drive circuit 1130C.

In FIG. 18, the control circuit 1120 and the protection circuit 1140C can be said to constitute a state controller which controls the state of the drive circuit 1130C, and by the state controller, the drive circuit 1130C is controlled to be in one of the low-output state (the first state) and the high-output state (the second state). If, despite the predetermined time $T_{TH2}$ having elapsed after the state of the drive circuit 1130C turning from the low-output state to the high-output state, the output terminal voltage $V_G$ does not rise to or above the threshold voltage $V_{REF2}$, the state controller turns the drive circuit 1130C to the low-output state.

Although, in FIG. 18, a configuration where the fault signal Sc is fed to the pre-driver 1139 is adopted, the fault signal Sc can be fed not to the pre-driver 1139 but to the control circuit 1120 so that, when the fault signal Sc is at high level, the control circuit 1120 acts as the leading agent of protection operation to turn the drive circuit 1130C to the low-output state.

Sixth Embodiment

A sixth embodiment of the present invention will be described. The sixth embodiment, and also the seventh to ninth embodiments described later, is an embodiment based on the fifth embodiment. Accordingly, for any feature of the sixth to ninth embodiments of which no particular description is given, unless inconsistent, the corresponding description of the fifth embodiment may apply to the sixth to ninth embodiments. Any feature of the sixth embodiment that is inconsistent with one of the fifth embodiment, the description of that feature of the sixth embodiment may prevail (the same applies to the seventh to ninth embodiments described later). Unless inconsistent, any two or more of the fifth to ninth embodiments can be combined together. Unless inconsistent, any two or more of the first to ninth embodiments can be combined together.

The sixth embodiment deals with examples of use of the driving device 1100 described in connection with the fifth embodiment. It is possible to configure an isolated synchronous-rectification DC-DC converter which uses the driving device 1100. The isolated synchronous-rectification DC-DC converter according to the sixth embodiment is the same as the isolated synchronous-rectification DC-DC converter according to the first embodiment (FIG. 1), and thus the isolated synchronous-rectification DC-DC converter according to the sixth embodiment will also be referred to as the isolated synchronous-rectification DC-DC converter 1 or the DC-DC converter 1. In the sixth embodiment, the configuration and the operation of the DC-DC converter 1 are as described in connection with the first embodiment, and as shown in FIG. 1, the DC-DC converter 1 includes the primary-side control IC 10.

The driving device 1100 according to the fifth embodiment can be used as the primary-side control IC 10, or the driving device 1100 according to the fifth embodiment can be included among the components of the primary-side control IC 10. The primary-side control IC 10 is an electronic component (semiconductor device) produced by enclosing a semiconductor integrated circuit in a resin housing (package), and the circuits constituting the primary-side control IC 10 are integrated together using semiconductor elements. The housing of the electronic component as the primary-side control IC 10 is provided with a plurality of external terminals exposed outside of the IC 10. The secondary-side control IC 20 has a structure similar to that of the primary-side control IC 10 shown in FIG. 2.

As part of the plurality of external terminals provided in the primary-side control IC 10, external terminals TM1 to TM5 are shown in FIG. 1. The external terminals TM1 to TM3 provided in the primary-side control IC 10 correspond to the external terminals TM1 to TM3 (see FIG. 12) described in connection with the fifth embodiment. The external terminal TM1 is connected to the gate of the switching transistor M1. Accordingly, the output terminal voltage $V_G$ in FIG. 12 serves as the gate voltage of the switching transistor M1. The external terminal TM2 is a power terminal, and receives the supply voltage VCC from the primary-side power supply circuit 11. The external terminal TM3 is connected to the ground GND1. The ground GND1 corresponds to the ground GND in the fifth embodiment. The external terminals TM4 and TM5 receive the feedback signal $V_{FB}$ and the current detection signal $V_{CS}$, respectively.

To the primary-side control IC 10 including the driving device 1100, the configuration of example EX5_1 (FIG. 15) is applied. In principle, it is also possible to adopt the configuration of example EX5_2 or EX5_3 (FIG. 17 or FIG. 18) in the primary-side control IC 10 including the driving device 1100.

In comparison with the driving device 1100 according to the fifth embodiment and the primary-side control IC 10, the drive control signal $S_{CNT}$ is generated based on the feedback signal $V_{FB}$ or the current detection signal $V_{CS}$, and with no power short circuit or ground short circuit occurring, a pulse signal based on the drive control signal $S_{CNT}$ is fed to the gate of the switching transistor M1.

Seventh Embodiment

A seventh embodiment of the present invention will be described. In the sixth embodiment, the DC-DC converter 1 is an isolated synchronous-rectification DC-DC converter, but the DC-DC converter 1 may be configured in any other manner so long as it generates the output voltage $V_{OUT}$ on the secondary side of the transformer TR (that is, in the secondary-side circuit) from the input voltage $V_{IN}$ applied to the primary winding W1. The description given above in connection with the second embodiment also applies to the DC-DC converter 1 according to the sixth embodiment.

Eighth Embodiment

An eighth embodiment of the present invention will be described. The eighth embodiment deals with uses of an isolated DC-DC converter according to the present invention.

As shown in FIG. 9, it is possible to configure an AC-DC converter 300 which uses an isolated DC-DC converter according to the present invention. The configuration and operation of the AC-DC converter 300 is as described in connection with the third embodiment. The DC-DC converter 1 according to the sixth or seventh embodiment can be used as the isolated DC-DC converter 304 in the AC-DC converter 300.

Furthermore, it is also possible to configure a power adapter 320 (see FIG. 10) or an electric appliance 340 (see FIG. 11A or 11B) by using the AC-DC converter 300 configured to include the DC-DC converter 1 according to the sixth or seventh embodiment. The configuration and the operation of the power adapter 320 and the electric appliance 340 are as described in connection with the third embodiment described previously, and the description of the third embodiment applies to this embodiment.

Ninth Embodiment

A ninth embodiment of the present invention will be described. The ninth embodiment deals with some modified techniques and the like applicable to the sixth to eighth embodiments.

As described previously, the circuit elements of the primary-side control IC 10 are formed in the form of a semiconductor integrated circuit, and the semiconductor integrated circuit is enclosed in a resin housing (package) to thereby produce a semiconductor device. Instead, a plurality of discrete components may be used to build circuits equivalent to those in the primary-side control IC 10. This applies also to the driving device 1100. Some of the circuit elements described above as being included in the primary-side control IC 10 may be provided outside the primary-side control IC 10 to be externally connected to the primary-side control IC 10. Reversely, some of the circuit elements described above as being provided outside the primary-side control IC 10 may be provided inside the primary-side control IC 10.

With respect to any signal or voltage, the relationship between their high and low levels may be reversed in a manner that does not depart from the technical concept discussed above.

A modification is possible in which FETs of N and P channel types are interchanged.

The driving device 1100 or the primary-side control IC 10 is usable in any application where the voltage level of the output terminal TM1 needs to be switched between high and low levels. In particular, for example, the driving device 1100 or the primary-side control IC 10 may function as a gate driving device for driving the gate of a target transistor. The target transistor in the configuration shown in FIG. 1 is the switching transistor M1 provided in the primary-side circuit of the isolated DC-DC converter 1, but in the present invention, the target transistor is not limited to this.

Figure 19:
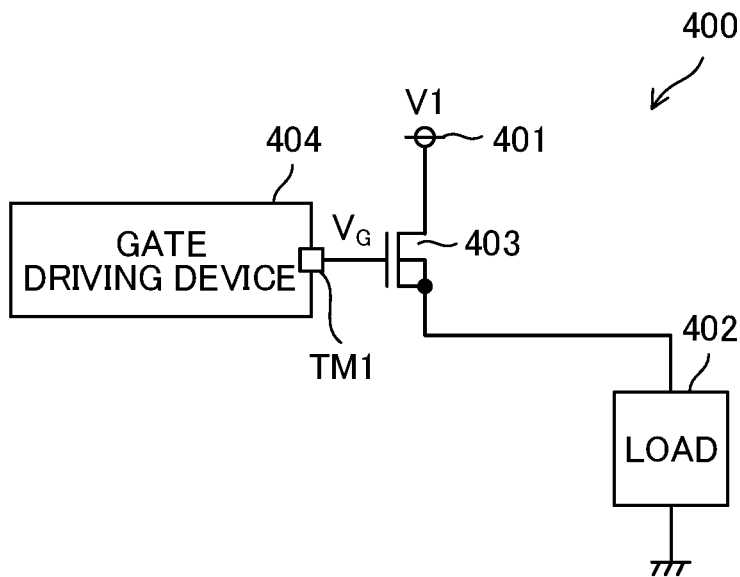
FIG. 19 is a diagram showing a configuration of a load driving device according to a ninth embodiment of the present invention.

For example, as shown in FIG. 19, in a load driving device 400 which controls an output transistor 403 inserted in series between a line 401 to which a predetermined direct-current supply voltage V1 is applied and a load 402 to thereby supply power to the load 402 via the output transistor 403, the output transistor 403 can be treated as the target transistor. The load driving device 400 can be provided with a gate driving device 404 having a configuration equivalent to the driving device 1100 or the primary-side control IC 10 so as to drive the gate of the output transistor 403 by using the gate driving device 404. The output terminal TM1 of the gate driving device 404 is connected to the gate of the output transistor 403, and the gate driving device 404 feeds a pulse signal (the voltage $V_G$) to the gate of the output transistor 403 to thereby drive the switching of the output transistor 403.

In the configuration in FIG. 19, the target transistor (403) and the load (402) are connected in series with each other, and when the target transistor (403) is on, a current based on the direct-current supply voltage V1 is supplied to the load (402) via the target transistor.

For another example, a switching transistor in a non-isolated switching power supply circuit can be taken as a target transistor, and a gate driving device having a configuration equivalent to the driving device 1100 or the primary-side control IC 10 may be applied to the target transistor.

Figure 20:
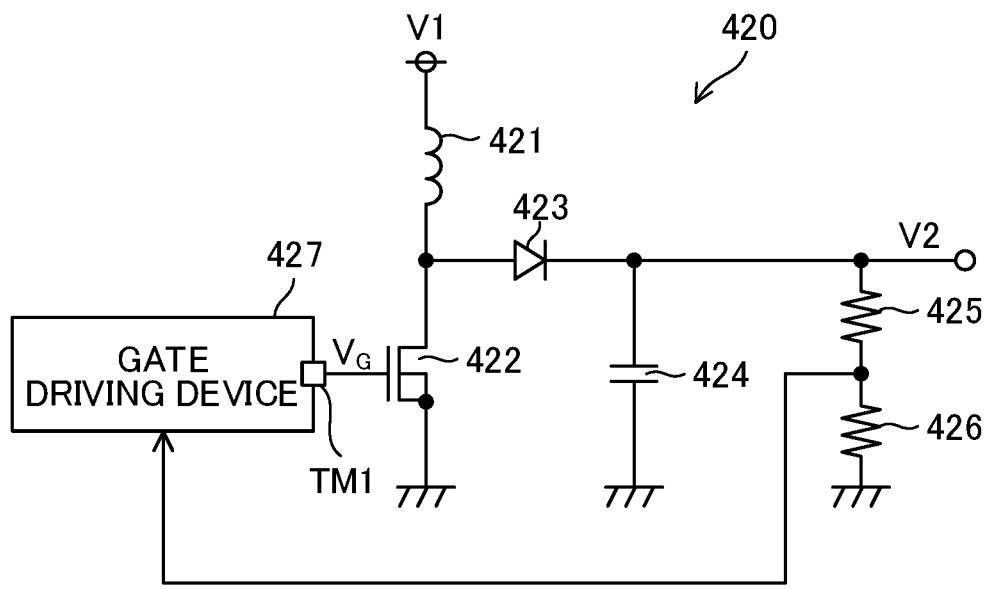
FIG. 20 is a diagram showing a configuration of a non-isolated step-up DC-DC converter according to the ninth embodiment of the present invention.
Figure 21:
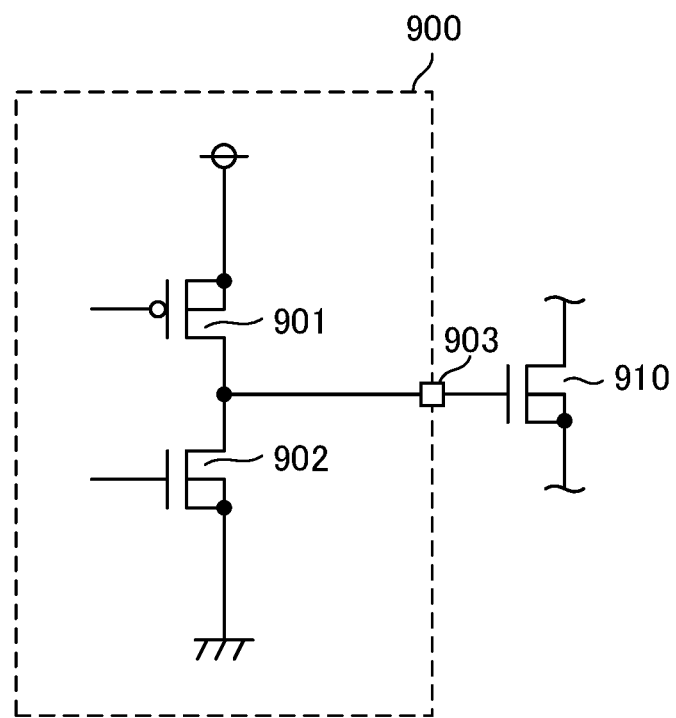
FIG. 21 is a diagram showing a configuration example of a common driving device.

As an example, FIG. 20 shows a non-isolated step-up DC-DC converter 420. The non-isolated step-up DC-DC converter 420 includes components identified by the reference signs "421" to "427". In the non-isolated step-up DC-DC converter 420, a predetermined direct-current input voltage V1 is applied to one end of an inductor 421, and the other end of the inductor 421 is connected to the drain of a switching transistor 422 configured as an N-channel MOSFET and also to the anode of a diode 423. The cathode of the diode 423 is connected to one end of a smoothing capacitor 424. The other end of the smoothing capacitor 424 and the source of the switching transistor 422 are connected to a ground at a reference voltage of 0 V. At the connection node between the cathode of the diode 423 and the smoothing capacitor 424, a direct-current output voltage V2 appears. Voltage dividing resistors 425 and 426 are used to feed a gate driving device 427 with a feedback voltage commensurate with the output voltage V2. Based on the feedback voltage, the gate driving device 427 feeds a pulse signal to the gate of the switching transistor 422 to thereby drive the switching of the switching transistor 422 so that the output voltage V2 stabilizes at a desired target voltage that is higher than the voltage V1. Here, the switching transistor 422 is treated as the target transistor, and a configuration equivalent to the driving device 1100 or the primary-side control IC 10 is applied to the gate driving device 427. Accordingly, the output terminal TM1 of the gate driving device 427 is connected to the gate of the transistor 422 so that the output terminal voltage $V_G$ is applied to the gate of the transistor 422.

In the configurations shown in FIG. 1 and FIG. 20, the target transistor (M1 or 422) and the coil (W1 or 421) are connected in series with each other so that, when the target transistor is on, a current based on the direct-current voltage ($V_{IN}$ or V1) flows through the target transistor and the coil. The coil here corresponds to the primary winding W1 in the configuration shown in FIG. 1, and corresponds to the inductor 421 in the configuration shown in FIG. 20.

A load such as a motor can be connected to the output terminal TM1 of the driving device 1100 according to the present invention.

The transistors described above can each be a transistor of any kind. For example, a transistor described above as a MOSFET may be replaced with a junction FET, an IGBT (insulated-gate bipolar transistor), or a bipolar transistor. Any transistor has a first electrode, a second electrode, and a control electrode. In an FET, one of the first and second electrodes corresponds to the drain, the other of them corresponds to the source, and the control electrode corresponds to the gate. In an IGBT, one of the first and second electrodes corresponds to the collector, the other of them corresponds to the emitter, and the control electrode corresponds to the gate. In a bipolar transistor that does not belong to the IGBT, one of the first and second electrodes corresponds to the collector, the other of them corresponds to the emitter, and the control electrode corresponds to the base.

Suitable as the target transistor discussed above is a voltage-controlled output transistor such as an FET, which can be a MOSFET, or an IGBT (that is, a transistor in which the current flowing between the first and second electrodes is controlled based on the voltage at the control electrode), though a bipolar transistor can be the target transistor.

The embodiments of the present invention allow for many modifications made as necessary within the scope of the technical concept set forth in the appended claims. The embodiments described above are merely examples of how the present invention can be implemented, and the senses of the terms used to define the present invention and its features are not limited to those in which they are used in the description of the embodiments given above. All specific values mentioned in the above description are merely examples, and can naturally be altered to different values.

What is claimed is:

1. A switching control device comprising:
   an output terminal connected to a control electrode of a switching element;
   a voltage input terminal receiving, as a sense voltage, a voltage appearing across a sense resistor to be connected in series with the switching element;
   a control circuit configured to generate a drive control signal; and
   a drive circuit configured to turn on or off the switching element via the output terminal based on the drive control signal,
   wherein
   the control circuit is configured
   to be capable of performing current control in which the control circuit, after turning on the switching element, determines a turn-off time point of the switching element based on the sense voltage, and
   to turn off the switching element during the current control if, despite a predetermined time having passed after the switching element being turned on, the sense voltage does not reach a predetermined threshold voltage.

2. The switching control device according to claim 1, wherein
a predetermined direct-current voltage is applied to a series circuit composed of the switching element, the sense resistor, and a coil, and
during an on-period of the switching element, as time elapses after turning-on of the switch element, a current that flows through the switching element increases.

3. The switching control device according to claim 1, wherein
the control circuit is configured, in the current control, to turn off the switching element in response to the sense voltage reaching a predetermined turn-off reference voltage after the switching element being turned on, and
the threshold voltage is lower than the turn-off reference voltage.

4. The switching control device according to claim 1, wherein
the control circuit is configured, in the current control, to turn off the switching element in response to the sense voltage reaching a predetermined turn-off reference voltage after the switching element being turned on, and
the threshold voltage has a same voltage value as the turn-off reference voltage.

5. The switching control device according to claim 1, wherein the switching control device is configured as a semiconductor integrated circuit.

6. An isolated DC-DC converter comprising:
a transformer having a primary winding and a secondary winding;
a switching transistor as a switching element connected to the primary winding;
a sense resistor connected in series with the switching transistor; and
a primary-side control circuit configured to control turning on and off of the switching transistor,
the isolated DC-DC converter generating an output voltage on a secondary side of the transformer from an input voltage applied to the primary winding,
wherein
the switching control device according to claim 1 is used as the primary-side control circuit, and
a control electrode of the switching transistor is connected to the output terminal of the switching control device, and switching of the switching transistor is driven by the switching control device.

7. An AC-DC converter comprising:
a rectification circuit configured to perform full-wave rectification on an alternating-current voltage;
a smoothing capacitor smoothing a full-wave rectified voltage to generate a direct-current voltage; and
the isolated DC-DC converter according to claim 6 generating a direct-current output voltage from an input voltage as the direct-current voltage.

8. A power adapter comprising:
a plug receiving an alternating-current voltage;
the AC-DC converter according to claim 7; and
a housing in which the AC-DC converter is housed.

9. An electric appliance comprising:
the AC-DC converter according to claim 7; and
a load driven based on an output voltage of the AC-DC converter.

* * * * *